(12) United States Patent
Holloway et al.

(10) Patent No.: US 11,584,975 B1
(45) Date of Patent: Feb. 21, 2023

(54) INTEGRATED PRESSURE OXIDATIVE LEACH OF COPPER SULPHIDIC FEED WITH COPPER HEAP LEACH

(71) Applicant: Sherritt International Corporation, Fort Saskatchewan (CA)

(72) Inventors: Preston Carl Holloway, Edmonton (CA); Jan Tjeerd Smit, Edmonton (CA); Aysan Molaei, Edmonton (CA)

(73) Assignee: Sherritt International Corporation, Fort Saskatchewan (CA)

( * ) Notice: Subject to any disclaimer, the term of this patent is extended or adjusted under 35 U.S.C. 154(b) by 0 days.

(21) Appl. No.: 17/458,203

(22) Filed: Aug. 26, 2021

(51) Int. Cl.
  C22B 15/00    (2006.01)
  C22B 1/02     (2006.01)
  C22B 30/04    (2006.01)
  C22B 3/08     (2006.01)

(52) U.S. Cl.
  CPC ............ C22B 15/0071 (2013.01); C22B 1/02 (2013.01); C22B 3/08 (2013.01); C22B 30/04 (2013.01)

(58) Field of Classification Search
  CPC ......... C22B 15/0071; C22B 1/02; C22B 3/08; C22B 30/04
  USPC ........................................................ 75/743
  See application file for complete search history.

(56) References Cited

U.S. PATENT DOCUMENTS

| | | |
|---|---|---|
| 3,218,161 A | 11/1965 | Kunda |
| 5,223,024 A | 6/1993 | Jones |
| 5,443,622 A | 8/1995 | Gabb |
| 5,616,168 A | 4/1997 | Gabb |
| 5,698,170 A | 12/1997 | King |
| 5,895,633 A | 4/1999 | King |
| 6,451,088 B1 | 9/2002 | Marsden |
| 6,455,019 B2 | 9/2002 | Jones |

(Continued)

FOREIGN PATENT DOCUMENTS

| | | |
|---|---|---|
| CA | 2138381 | 2/2006 |
| WO | WO 94/00607 A1 | 1/1994 |

OTHER PUBLICATIONS

Barnes A., Autoclave Technology—Applications for Sulphide Concentrates and Laterite Ores, CICITEM Annual Meeting, Antofagasta, Chile Jul. 28-29, 2010.

(Continued)

*Primary Examiner* — Brian D Walck
*Assistant Examiner* — Danielle M. Carda
(74) *Attorney, Agent, or Firm* — Leydig, Voit & Mayer, Ltd.

(57) ABSTRACT

An integrated pressure leaching, heap leaching process for recovering copper from sulphidic feed containing iron, arsenic, and copper. Aqueous feed slurry of the sulphidic feed is pressure oxidized to form a liquid phase containing free sulphuric acid and aqueous copper sulphate, and to precipitate arsenic as solid iron arsenic compounds. Treated slurry is withdrawn from the pressure vessel and the liquid phase is separated from the solids. Copper is recovered from the separated liquid phase and generates a solution enriched in acid and depleted in copper. At least a portion of this solution is neutralized in a copper heap leach to produce a PLS containing copper and reduced in acid. At least a portion of the heap leach PLS is neutralized to produce a solution further reduced in acid, and solids containing copper precipitates, followed by a liquid solid separation.

34 Claims, 15 Drawing Sheets

(56) References Cited

U.S. PATENT DOCUMENTS

| | | |
|---|---|---|
| 7,666,371 B2 | 2/2010 | Marsden et al. |
| 8,147,781 B2 | 4/2012 | Holloway |
| 8,252,254 B2 | 8/2012 | Choi et al. |
| 10,544,482 B2 | 1/2020 | Buban |
| 2008/0170976 A1 | 7/2008 | Hultholm et al. |
| 2009/0019970 A1 | 1/2009 | Ritchie et al. |
| 2009/0293680 A1 | 12/2009 | Ritchie et al. |
| 2015/0329937 A1* | 11/2015 | Salomon-de-Friedberg ................ C22B 3/06 75/743 |
| 2017/0009318 A1* | 1/2017 | Buban ................ C22B 3/08 |
| 2018/0298466 A1 | 10/2018 | Smit et al. |

OTHER PUBLICATIONS

Collins, M. J. et al., Pilot Plant Pressure Oxidation of Refractory Gold-Silver Concentrate, CIM Journal, vol. 4, No. 3, 2013.

Gabb et al., The Industrial Separation of Copper and Arsenic as Sulfides, JOM, Sep. 1999, pp. 18-19.

Marsden et al., Sulfate-Based Process Flowsheet Options for Hydrometallurgical Treatment of Copper Sulfide Concentrates, Cu2007, vol. IV (Book 1), The John E. Dutrizac International Symposium on Copper Hydrometallurgy, Ed. Riveros et al., Toronto, Canada, 2007, pp. 77-100.

McDonald et al., High Temperature Pressure Oxidation of a Low-Grade Nickel Sulfide Concentrate with Control of the Residue Composition, Minerals 2020, 10, 249, pp. 1-24.

Rivera et al., Radomiro Tomic Expansion and Optimization Project, Acorga Notes, Issue 5, Oct. 2001, p. 2-4.

Wang et al., Integration of Copper Concentrate Pressure Oxidatiion Process With Copper Heap Leaching for Improving Overall Metallurgical Performance, Hydrometallurgy 2014, vol. 1, pp. 39-55.

International Search Report and Written Opinion, dated Dec. 21, 2022 in International Patent Application PCT/CA2022/051286.

* cited by examiner

INTEGRATED PRESSURE OXIDATIVE LEACH OF COPPER SULPHIDIC FEED WITH COPPER HEAP LEACH

FIELD

This disclosure generally relates to a process for recovering copper from a sulphidic feed by pressure oxidative leaching and heap leaching. In some embodiments the disclosure relates to the processing of a copper sulphidic feed containing appreciable iron, arsenic and silver.

BACKGROUND

Sulphidic ores and concentrates are typically processed by smelting processes to recover non-ferrous metals such as copper. With ever tightening environmental emission standards, lower quality concentrates, such as those with higher levels of contaminants, such as As, Hg, Sb and/or Bi, are increasingly common. These concentrates can impose a significant strain on the off-gas handling facilities in these smelting operations, while import/export restrictions on such ore or concentrates currently make it difficult to export concentrates with an arsenic concentration greater than 0.5 wt %. Thus, for complex concentrates, such as those containing greater than 0.5 wt % As, hydrometallurgical processes, such as pressure oxidative leaching, may be considered as an alternative to smelting for copper sulphide concentrates.

In general, pressure oxidative leaching involves subjecting a slurry including the ore or concentrate feed to elevated pressure and temperature in the presence of oxygen in a pressure vessel to decompose the minerals. The sulphide components of the ore are at least partially oxidized to dissolve metal values into solution and to convert the sulphide sulphur to sulphate in solution. After separating the liquid phase from the solids, the metals can then be recovered from the solids and/or from the separated liquid phase (sometimes termed pressure leach solution or PL solution) of the treated slurry.

Sulphidic ores or concentrates containing precious metals, such as gold or silver, may be processed by pressure oxidative leaching to improve the recovery of precious metals by cyanide leaching. Gold typically remains as particles of metallic gold in pressure oxidative leaching, and, thus, is amenable to cyanide leaching. However, at least a portion of the silver in the sulphide ores or concentrates reacts to form silver jarosites. Silver jarosites are insoluble in cyanide, resulting in low silver recoveries by cyanide leaching.

The "lime boil" process is one method that is used commercially break down silver jarosites and make the silver values soluble in cyanide leaching (Collins et al. (Pilot Plant Pressure Oxidation of Refractory Gold-Silver Concentrate, CIM Journal, Vol. 4, No. 3, 2013, Choi et al., U.S. Pat. No. 8,252,254 to Choi et al., issued Aug. 28, 2012). In this process, the pressure oxidation residue is mixed with lime slurry and heated, and the reaction with lime breaks down the silver jarosite to produce gypsum and iron hydroxides.

For sulphidic concentrates that contain arsenic and copper, copper is dissolved in pressure leaching, but may precipitate as insoluble copper arsenate, resulting in insoluble losses of copper values to the pressure leach residue and lower yields of copper from the pressure leaching process. Iron in the sulphide concentrate, or iron added to the feed from other sources, can help limit this loss of copper values, through the formation of iron arsenate compounds instead of copper arsenates. Depending on the conditions on the pressure leach and the Fe:As ratio in the feed, it is possible to form environmentally stable iron compounds, such as scorodite or basic ferric arsenate sulphate (BFAS), during pressure leaching.

One example of a copper recovery process for feeds containing iron, copper and arsenic is Applicant's recent patent (U.S. Pat. No. 10,544,482 to Buban et al., issued Jan. 28, 2020). In this process, the Fe:As molar ratio for the pressure oxidative leaching step is preferably maintained at greater than 4:1 to help produce stable iron arsenates and limit copper arsenate precipitation. The treated slurry exiting the autoclave is controlled for temperature, free acid level and/or residence time to lessen arsenic re-dissolution and to maintain the stability of the solid iron arsenic compounds formed during pressure oxidative leaching. Thus, the process introduces limits to the amount of arsenic that can be treated, per unit autoclave volume, and the range of feeds that can be treated. The patent does not address silver recovery if the feed includes commercially appreciable amounts of silver.

If the solids from pressure leaching of sulphide concentrates containing Cu, Fe and As, such as the process of U.S. Pat. No. 10,544,482, are treated in a lime boil process to improve the recovery of silver, the copper and iron arsenate compounds break down under lime boil conditions to form gypsum, ferric hydroxide, copper hydroxide, calcium arsenate, and/or less stable iron arsenates. These arsenic precipitates may cause the residues to fail the TCLP test, which is used to assess the environmental stability of materials.

Copper hydroxides produced in the lime boil are soluble in cyanide leaching. This soluble copper consumes large amounts of cyanide and large amounts reagents to recover the metals from the cyanide compounds in solution (e.g. activated carbon or zinc dust), relative to the leaching of just gold and silver values, both of which may significantly increases the operating costs for precious metals recovery. Cyanide recovery, such as with the SART (Sulphidisation, Acidification, Recycling and Thickening) process, may be required to recover cyanide and/or copper and silver values, but may require in the production of an impure silver product, such as a copper silver sulphide precipitate.

In Applicant's recent patent application, US Patent Publication No. 2018/0298466 to Smit et al., published Oct. 18, 2018, a process for recovering one or both of copper and silver from a sulphidic feed containing iron, arsenic, copper and silver by pressure oxidizing is described. The process includes operating the pressure vessel at low acidity, low solids conditions, including a sufficiently low solids content to maintain a free acid level below 30 g/L in the liquid phase, and adding heat to maintain a temperature in the pressure vessel above 200° C. These conditions limit formation of insoluble copper arsenates and limit formation of silver jarosites, which allows for silver recovery by cyanide leaching and/or flotation of the pressure leach residue without treating the pressure leach solids with a lime boil step. High silver recoveries (up to 90%) are reported while producing cyanidation residues, which are environmental stable, based on TCLP testing.

The low acidity, low solids pressure leach process of US Patent Publication No. 2018/0298466 indicates that copper may be recovered from solution by combining the pressure leach solution with solutions from a copper heap leach operation, as proposed in other references such as is also taught in U.S. Pat. No. 5,698,170 to King, issued Dec. 16, 1997, and U.S. Pat. No. 6,451,088 to Marsden et al., issued Sep. 17, 2002.

Copper heap leaching is widely used to recover copper values from low grade copper ores. After blasting and/or size reduction, the ore is piled into a heap and acidic solution, typically containing sulphuric acid, is added to the top of heap and allowed to percolate through the heap. Oxidized copper minerals, such as azurite, malachite, chrysocolla, tenorite and cuprite, are dissolved. Secondary sulphide minerals, such as chalcocite, covellite and bornite, may also be dissolved to varying degrees if the heap leach solution contains ferric iron ($Fe^{3+}$) or if bioleaching microorganisms (e.g. bacteria) are used to assist in the oxidation of these sulphide minerals.

Solution is recovered from the heap and is typically treated for copper recovery by solvent extraction. Copper solvent extraction is selective to copper. Copper is loaded in exchange for hydrogen ions on the extractant, while impurity elements, such as Al, Fe, Mg, etc., are left in the raffinate solution. This raffinate solution, which contains these impurity elements, is high in acid and low in copper and is returned to the heap to leach additional copper values from the heap.

More acid is typically required for heap leach then is required for leaching copper alone, due to acid consuming reactions with other minerals in the oxide or sulphide ores. This includes reactions with carbonate minerals, or reactions with gangue minerals in the ore to dissolve soluble metal sulphates, such as aluminum, iron, magnesium, sodium, or potassium sulphates. In Chile, for example, the acid requirement for heap leaching of copper oxides and/or secondary sulphides is typically on the order of 2.5 to 4 t acid/t heap leach copper. Typically, this addition acid is provided by adding concentrated sulphuric acid to make up for the losses of sulphuric acid in the heap.

A portion of the water added as heap leach solution evaporates or is lost to the heap and is replenished with fresh process water (make up water) to maintain the water balance of the heap leach system.

The make up water and the sulphuric acid are the main solution inputs within the heap leach water balance, with the remaining solution being recycled continuously through copper recovery and back to the leach. To maintain the water balance in the heap leach using the teachings of these references (US Patent Publication No. 2018/0298466, U.S. Pat. Nos. 5,698,170, and 6,451,088) the volume of pressure leach solution should be less than the water added to make up water losses to the heap or to evaporation. Otherwise, a solution bleed from the heap leach system is required, with the potential loss of both copper and acid values. Thus, this represents a practical limitation to the size of the pressure leach plant relative to the size of the heap leach operation using these references.

Sulphide precipitation in the metals industries is commonly performed with the addition of either hydrogen sulphide gas ($H_2S$) or alkali metal sulphides (e.g. sodium sulphide ($Na_2S$) or sodium hydrosulphide (NaHS)). If these reagents are added to precipitate copper sulphide with arsenic in solution, copper precipitates first, followed by arsenic. High levels of copper removal can lead to significant arsenic precipitation. For example, in Gabb et al., The Industrial Separation of Copper and Arsenic as Sulfides, JOM September 1999, p 18-19, over 30% of the arsenic from solution is precipitated when over 99% of the copper precipitated. This behaviour led to the development of a two stage sulphide precipitation process for a smelter waste stream in this reference, with a cleaner copper sulphide precipitated for sale, and an impure copper-arsenic sulphide is precipitated for recycle to the smelter, see U.S. Pat. No. 5,443,622 to Gabb et al., issued Aug. 22, 1995. This patent also uses sulphide reagents to precipitate copper and/or arsenic.

However, the combination of elemental sulphur and sulphur dioxide can also be used instead of sulphide reagents to precipitate copper as a sulphide from other metal elements. U.S. Pat. No. 3,218,161 to Kunda et al., issued Nov. 16, 1965 describes using sulphur and sulphur dioxide to selectively precipitate copper from nickel and/or cobalt solutions. U.S. Pat. No. 5,616,168 to Gabb et al., issued Apr. 1, 1997 describes the use of sulphur and sulphur dioxide to selectively precipitate copper from impurity streams from a copper smelter.

SUMMARY

In this disclosure, the integration of low acidity, low solids pressure leaching with a copper heap leach and the recovery of copper from solutions generated thereby, are disclosed in a process which can maintain the water balance in the combined process of heap leaching and pressure leaching, even if the volume of pressure leach solution is higher than the water added to make up for water loss in the heap or by evaporation. The integrated pressure leaching, heap leaching process of this disclosure also extends to copper recovery with the pressure oxidative leaching step being operated autothermally.

Broadly stated, a process is provided for recovering copper from a sulphidic feed containing iron, arsenic, and copper. The process includes:

a) pressure oxidizing an aqueous feed slurry of the sulphidic feed in a pressure vessel to form a liquid phase containing free sulphuric acid and aqueous copper sulphate, and to precipitate arsenic as solid iron arsenic compounds, while maintaining a temperature in the pressure vessel above 200° C.;

b) withdrawing from the pressure vessel treated slurry comprising the liquid phase containing sulphuric acid and copper sulphate, and solids containing the iron arsenic compounds;

c) separating the liquid phase from the solids in a liquid solid separating step;

d) recovering copper from the separated liquid phase and generating a solution enriched in acid and depleted in copper;

e) neutralizing at least a portion of the solution from step d) in a copper heap leach to produce a pregnant leach solution (PLS) containing copper and reduced in acid;

f) neutralizing at least a portion of the PLS from the heap leach to produce a solution further reduced in acid, and solids containing copper precipitates, and separating the liquids from the solids;

g) recycling the solution further reduced in acid from step f) as process solution for step a);

h) recycling the solids from step f) to combine with either the treated slurry from step b) or the liquid phase from step c) to re-dissolve copper and other metal values; and i) separating solids from step h) either with the treated slurry in the separating step c) or in a further liquid solid separating step, and feeding the liquid phase from the separating step c) or from the further separating step to the copper recovery of step d).

In some embodiments, the pressure oxidizing of step a) is operated autothermally, under conditions in which 100% of the heat to maintain an operating temperature of 220° C. in the pressure vessel is provided by the oxidation of the solids in the aqueous feed slurry.

In some embodiments the pressure oxidizing step a) is operated under conditions of low acidity and low solids, including controlling solids content in the aqueous feed slurry in the pressure vessel such that a free acid level below 30 g/L is maintained in the liquid phase, and such that heat generated by oxidizing the aqueous feed slurry provides less than 60% of the heat to maintain the temperature in the pressure vessel above 200° C., and adding heat to maintain the temperature in the pressure vessel above 200° C.

In some embodiments of low acidity, low solids operation, the solids content in the aqueous feed slurry is controlled by adding one or more of the process solution, steam and a feed slurry to the pressure vessel as part of the aqueous feed slurry, and providing heat to the pressure vessel to maintain the temperature in the pressure vessel above 200° C. by adding one or more of heated feed slurry, heated process solution and steam as part of the aqueous feed slurry.

In some embodiments of low acidity, low solids operation, the solution further reduced in acid from step f) is heated to provide the heated process solution for step a). In some embodiments of low acidity, low solids operation, heat or steam is recovered from one or more of the treated slurry, a subsequent pressure let down step, and a subsequent flashing step, and using that recovered heat or steam to supply at least a portion of the heat to the pressure vessel in step a).

In some embodiments, the copper recovery of step d) includes recovering copper by solvent extraction and electrowinning, and using a raffinate from the solvent extraction as the solution enriched in acid and depleted in copper for the heap leach of step e). In some embodiments, a portion of the PLS from the heap leach of step d) is fed to the copper recovery by solvent extraction and electrowinning, and a portion of the PLS from the heap leach is neutralized in step f) to produce the solution further reduced in acid and the solids containing copper precipitates.

In some embodiments, the copper recovery of step d) includes recovering copper by precipitating copper as copper sulphide with sulphur and sulphur dioxide to produce the solution enriched in acid and depleted in copper used in the heap leach of step e).

In some embodiments:
  i. a portion of the PLS from the heap leach of step e) is directed to a copper recovery by solvent extraction and electrowinning;
  ii. a portion of the PLS from the heap leach of step e) is neutralized in step f) to produce the solution further reduced in acid and the solids containing copper precipitates, and
  iii. a raffinate from the solvent extraction of step i) is used in the heap leach of step e).

In other embodiments:
  i. a portion of the PLS from the heap leach of step e) is directed to the copper recovery by precipitating copper as copper sulphide with sulphur and sulphur dioxide to produce the solution enriched in acid and depleted in copper for use in the heap leach of step d); and
  ii. a portion of the PLS from the heap leach of step e) is neutralized in step f) to produce the solution further reduced in acid and the solids containing copper precipitates.

In some embodiments, the sulphidic feed contains silver and/or gold, the solids in step (b) include at least a portion of the silver and/or gold; and the process further comprises recovering silver and/or gold from the solids after separation in step c) by cyanide leaching. In some embodiments, the sulphidic feed contains silver and the silver recovery by cyanide leaching is performed without a jarosite destruction step after step a).

In some embodiments, neutralizing in step f) to precipitate solids containing copper precipitates is conducted at a pH to precipitate at least a portion of the copper, aluminum, and iron, without precipitating magnesium, and in step g), magnesium in solution is recycled to the pressure vessel in the process solution for step a). In some embodiments, neutralizing in step f) to precipitate solids containing copper precipitates is conducted at a pH in the range of about 5.5 to 6. In some embodiments, the neutralizing agent in step f) contains limestone and optionally lime. In some embodiments, to increase magnesium in solution in step a), magnesium sulphate is added to the slurry in step c) or to the feed solution to steps e), f), and/or g), and/or a magnesium-containing neutralizing agent is added in step f).

In some embodiments, in step f), lime is added to a portion of the solution separated from step f) to increase the pH in order to precipitate at least a portion of the zinc and/or magnesium, and the solution reduced in magnesium and/or zinc is recycled with the process solution to step g).

In some embodiments, step h) is operated at a pH less than 2.5, or at a pH less than 1.5, to re-dissolve copper and other metal values including at least a portion of any aluminum and iron.

As used herein and in the claims, the terms and phrases set out below have the following definitions.

"Aqueous feed slurry" is used herein to refer to the combined feed to the pressure oxidative leaching step, and includes all process liquids, such as process solution and any steam added to the pressure vessel which condenses in the pressure vessel, and all solids added to the pressure vessel.

"Autothermal" or "autogenous" as used herein to describe operation of the pressure oxidative leaching step refers to operating the pressure vessel under conditions in which 100% of the heat to maintain an operating temperature of 220° C. in the pressure vessel is provided by the oxidation of the solids in the aqueous feed slurry.

"Commercially appreciable" as used herein to denote amounts of valuable metals, such as copper and/or silver metals, indicates that the metal is present in the sulphidic feed to the pressure oxidative leaching step in amounts which are economically sufficiently significant to warrant recovery from the feed. Commercially appreciable amounts that can be economically recovered in any process are dependent on the market prices for the metal, the capital and operating costs of the process, and the economic considerations for the location of the mine and/or processing plant. For example, under current metal prices and economic conditions, feeds having less than 10% copper and/or less than 100 g/t silver are generally considered to have less than commercially appreciable amounts of copper and silver respectively.

"Free acid level" or "free acid" refers to the concentration of $H_2SO_4$ in solution in the pressure oxidative leaching step, such as measured at discharge from the autoclave. The standard used to measure free acid level is conducted at room temperature (20° C.) by titrating of an aliquot of acidic solution with sodium carbonate solution to pH 3.5. Before performing this titration, potassium iodide is added to the solution to react with ferric iron ($Fe^{3+}$), which may hydrolyze and interfere with the $H_2SO_4$ titration, and sodium thiosulphate solution is added to react with any iodine ($I_2$) that is formed. The reactions involved in this determination are provided below:

$$2Fe^{3+}+2I^-=2Fe^{2+}+I_2$$

$$I_2+2S_2O_3^{2-}=2I^-+S_4O_6^{2-}$$

$$H_2SO_4+Na_2CO_3 \rightarrow Na_2SO_4+H_2O+CO_2.$$

"Process solution" refers to solution that is added to a pressure vessel, whether as part of a feed slurry, or separately.

"Quench solution" refers to a solution that is added to a pressure vessel as a method of direct cooling".

"Solids content" or "solids" as used herein with reference to the total solids in the pressure vessel during the pressure oxidative leaching step, is the fraction of the solids in the aqueous feed slurry, expressed as a percent by weight.

"Stability" or "stable" as used herein with reference to arsenic residue stability or the stability of solid iron arsenic compounds formed in pressure oxidative leaching, refers to maintaining the environmental stability of the arsenic solids that have been formed in the pressure oxidative leaching step and in the process steps subsequent to pressure oxidative leaching, and refers to the environmental stability as measured by the standard Toxicity Characteristic Leaching Procedure (TCLP). TCLP is a testing methodology for waste materials, with protocols set by the Environmental Protection Agency (EPA) in the United States, and other countries, see Environmental Protection Agency Publication SW-846, "Test Methods for Evaluating Solid Waste, Physical/Chemical Methods", Method 1311, "Toxicity Characteristic Leaching Procedure", Revision 6, February 2007. The current limit for arsenic in the TCLP leachate in the United States is 5 mg/L, (see Code of Federal Regulations, Title 40, Vol. 27, Section 261.24, Jul. 1, 2012). Solid iron arsenic compounds that are more stable than the regulatory limit (i.e., the arsenic concentration in TCLP leachate is less than 5 mg/L) can be formed in the pressure oxidative leaching step. Thus, "stable solids" as used herein refers to the stability of these solids, as measured by TCLP, from after pressure oxidation until after the solids are separated from the acidic leach solution, and after any subsequent cyanidation step.

DETAILED DESCRIPTION

The process of this disclosure extends to an integrated pressure oxidative leach of a copper sulphidic feed with a copper heap leach. The pressure oxidative leach step of the process may be practised autothermally, or under conditions of low acidity, low solids process such as described in Applicant's US Patent Publication 2018/0298466. Autothermal conditions for pressure oxidative leaching of are generally known in the industry, for example in the patents mentioned in the Background. The process of this disclosure is described below with reference to several exemplary embodiments shown in FIGS. 4-8. Copper is recovered from the pregnant leach solution from the pressure oxidative leaching step. Precious metals, such as Au or Ag, may be recovered from the solids (residue pulp) by cyanide leaching. When the pressure oxidative leach step is operated under low acidity, low solids condition, the precious metal recovery proceeds without an intervening lime boil step to destroy jarosites, and without the need to neutralize acid produced in the pressure leach.

Figure 2:
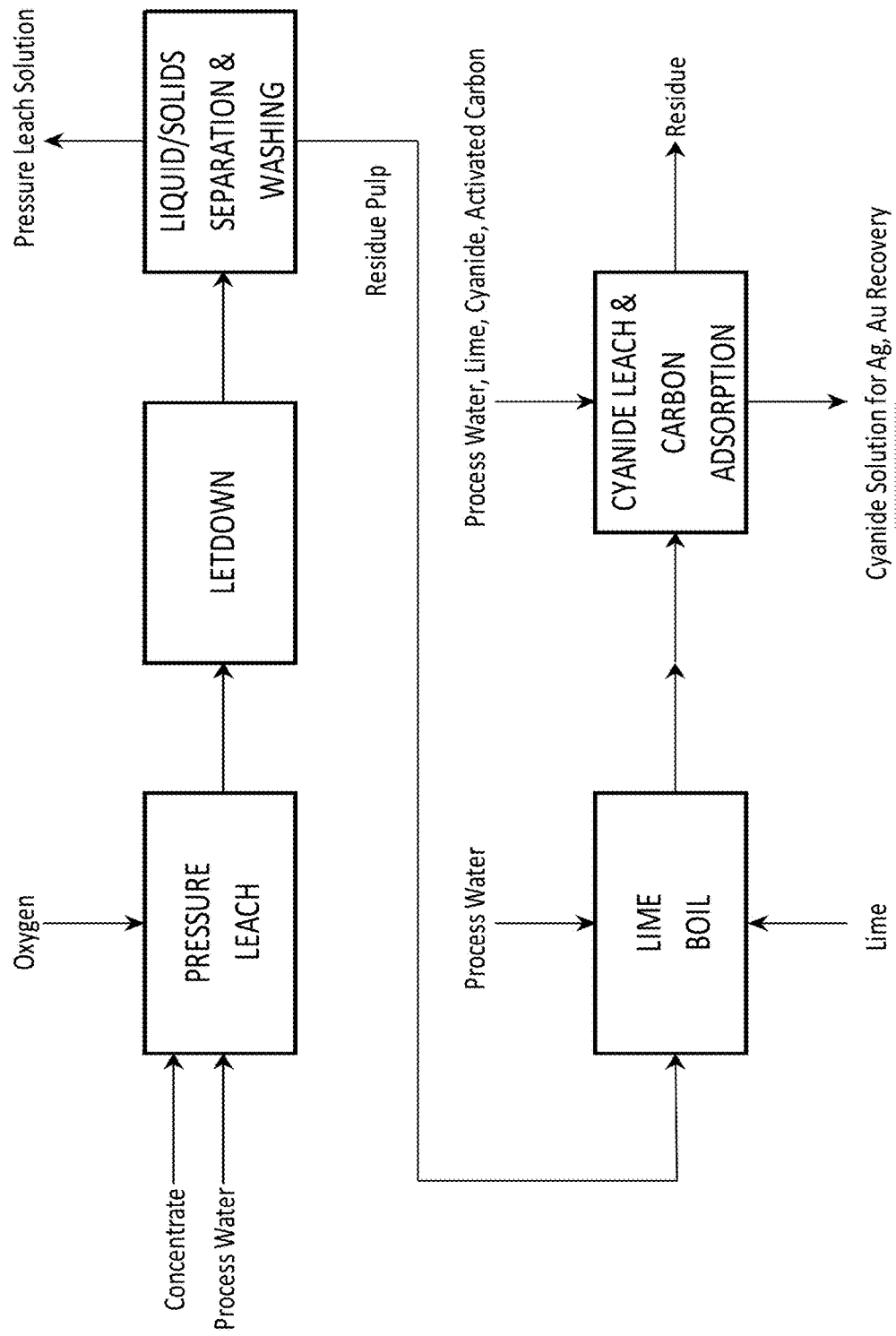
FIGS. 2 and 3 are schematic flow diagrams showing known pressure oxidative leach processes for metal recovery from sulphidic feed concentrates containing appreciable amounts of base metals such as copper, and/or precious metals, such as gold and/or silver.
Figure 3:
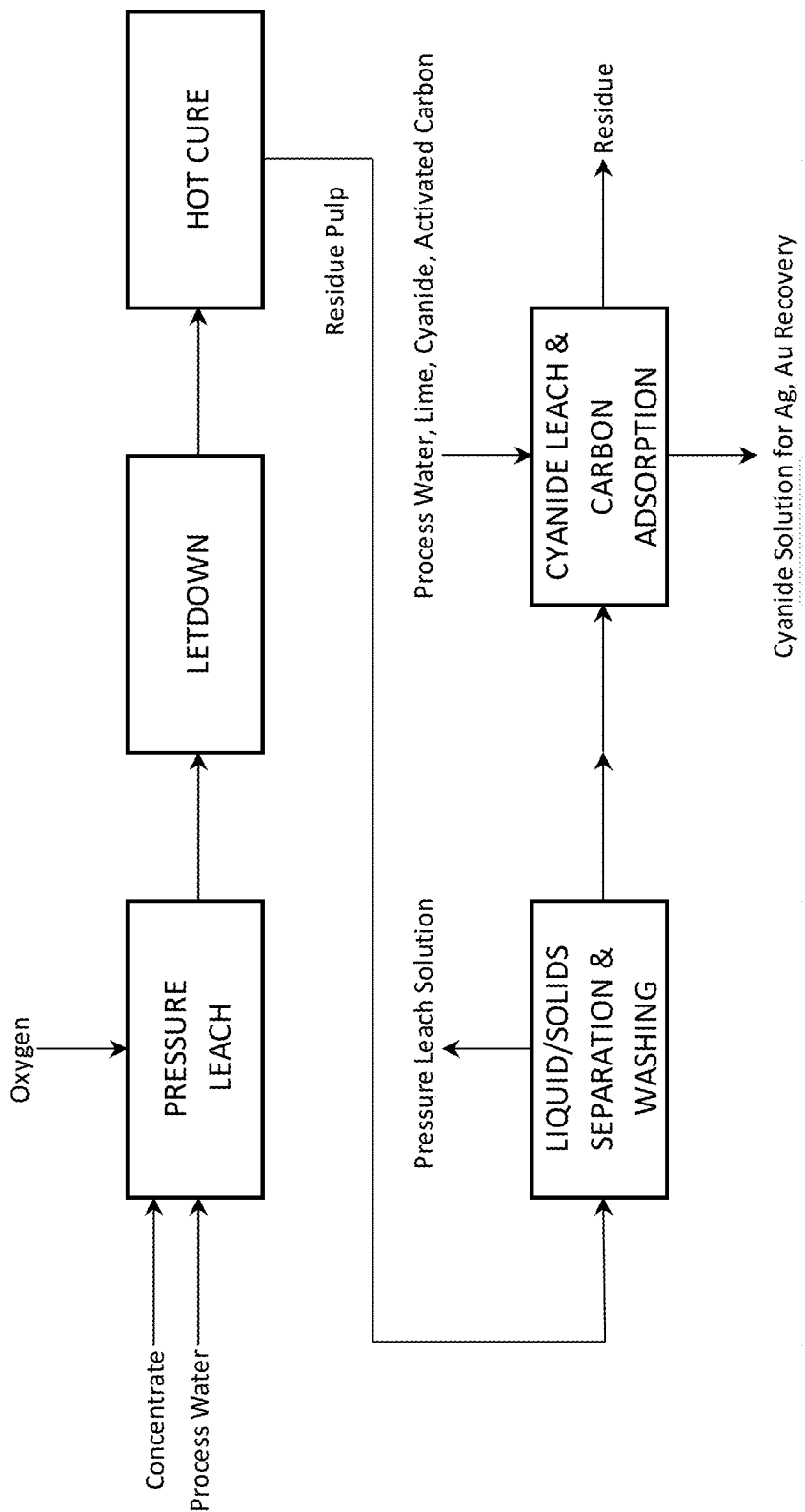

Operating the process under low acidity, low solids conditions is contrasted with the standard process for recovering copper in the presence of arsenic and with one or more precious metals such as Au or Ag, as shown in FIGS. 2 and 3. FIGS. 2 and 3 show standard operation of the autoclave with the solids content of the feed being sufficient to operate the autoclave autothermally with ambient temperature quench solution (i.e., below about 50° C.), with a jarosite destruction step after the pressure leach, and before the cyanidation step, in the form of a lime boil step. The processes of FIGS. 2 and 3 are consistent with processes in the patents mentioned in the Background section.

Figure 1:
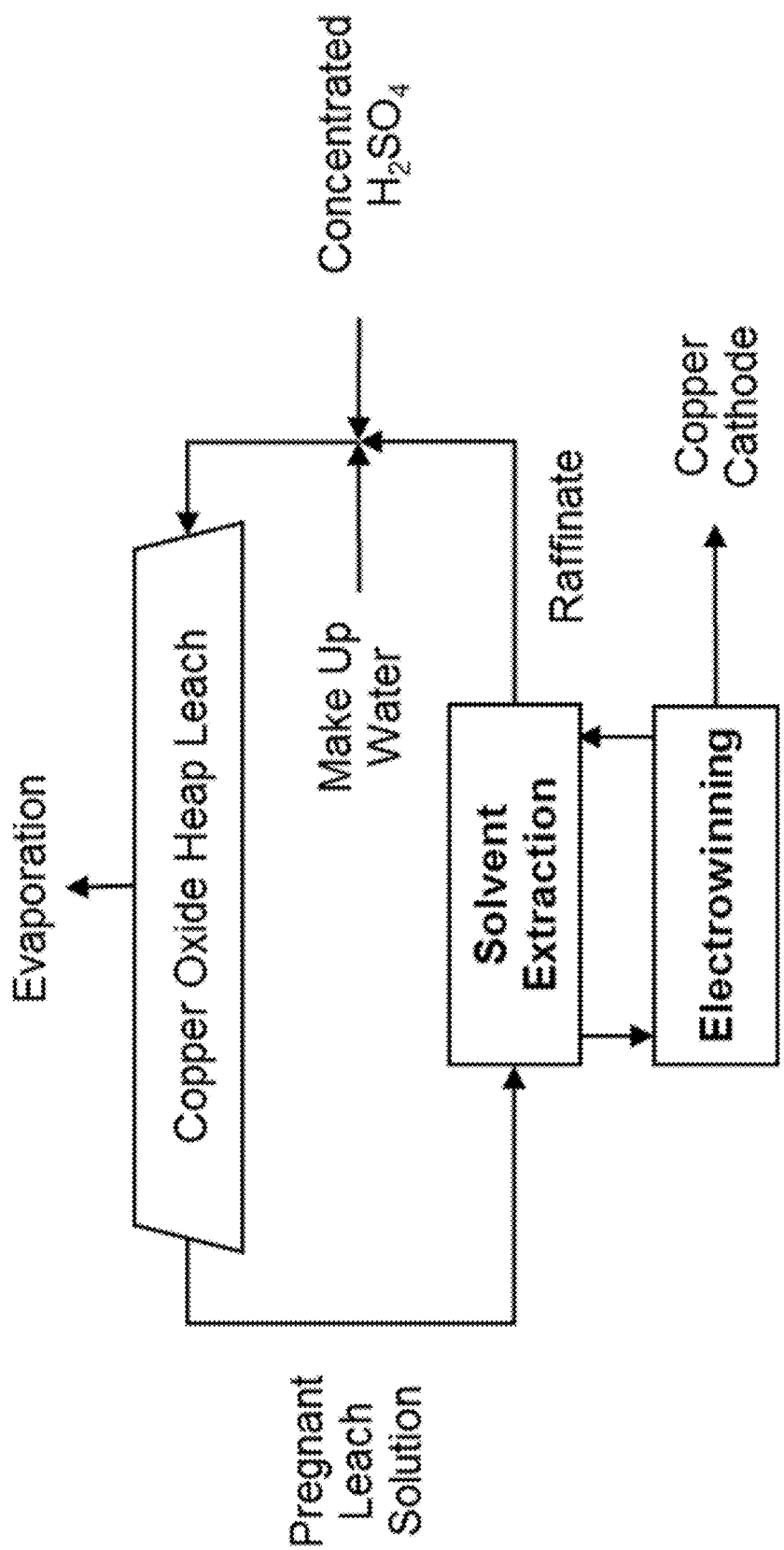
FIG. 1 illustrates the water balance for a typical prior art copper oxide heap leach operation.

FIG. 1 is included to show a water balance for a typical prior art copper oxide heap leach operation, and is provided for contrast to the water balance of the integrated heap leaching process of this disclosure.

Turning to the exemplary embodiments of FIGS. 4-8, the integrated process is described with reference to a pressure oxidative leaching step operated at low acidity, low solids conditions, such as taught in Applicant's US Patent Publication 2008/0298466.

Figure 4:
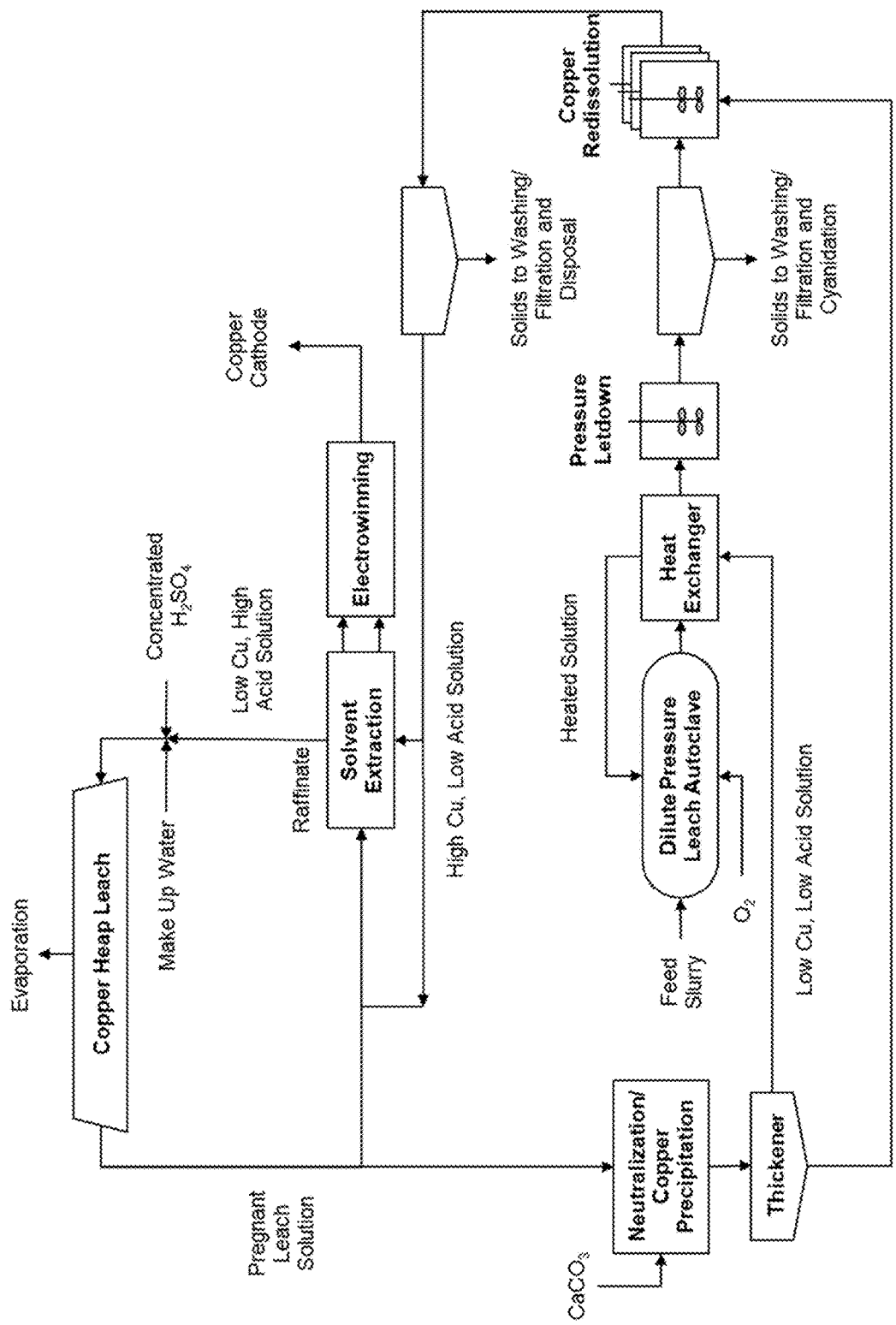
FIGS. 4-8 are flow diagrams showing embodiments for the integration of heap leaching and pressure leaching in accordance with the process of this disclosure.

FIG. 4 illustrates an integrated heap leach, pressure oxidative leach process including heat recovery by heat exchanger and copper recovery by solvent extraction and electrowinning. The process includes a pressure oxidative leaching autoclave, heat exchanger, a pressure letdown/flashing unit, a first liquid solid separation circuit, a copper redissolution unit, a second liquid solid separation unit, a solvent extraction/electrowinning (copper recovery) circuit, a copper heap leach circuit and a neutralization unit. The heap leach (HL) circuit is operated with an acidic raffinate feed from the solvent extraction circuit, with additional make up water and/or acidic solution such as concentrated sulphuric acid. The pregnant leach solution (PLS) from the heap leach contains copper and other dissolved metals and is reduced in acid. All or a portion of the HL PLS is fed to the neutralization unit to produce, after liquid solid separation, a solution further reduced in acid, and solids containing copper precipitates. A portion of the HL PLS may be fed to the solvent extraction unit, as shown in FIG. 4. An aqueous feed slurry of a sulphide feed containing iron, arsenic and copper is pressure oxidized in a pressure vessel, such as a multicompartment autoclave. The solution reduced in acid from the neutralization unit is recycled to provide process solution to the autoclave. The process solution to the autoclave is heated in a heat exchanger, which recovers heat from the treated slurry withdrawn from the autoclave. After pressure letdown, the solids are separated from the liquid phase in the first liquid solid separation circuit. The solids are further washed, filtered, and subjected to cyanidation for recovery of precious metals such as gold and silver. The liquid phase of the treated slurry from the autoclave is combined with the solids from the neutralization unit in the copper redissolution unit, to redissolve copper and other metal values, followed by liquid solid separation in the second liquid solid separation circuit. The liquid phase containing copper is sent to the solvent extraction/electrowinning (SX/EW) unit for copper recovery as copper cathode.

Figure 5:
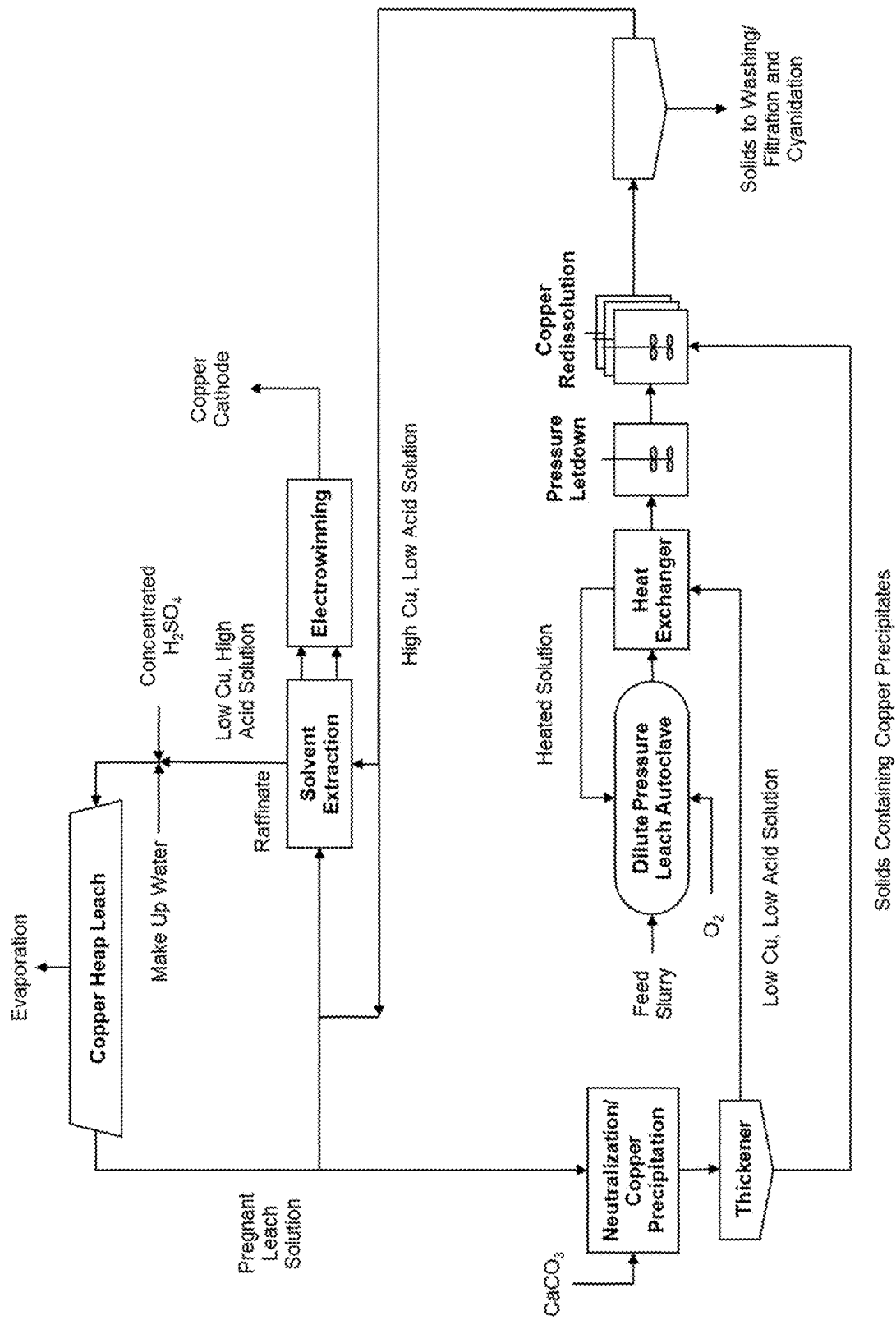

FIG. 5 illustrates an integrated heap leach, pressure oxidative leach process similar to the process of FIG. 4, including heat recovery with a heat exchanger and copper recovery by solvent extraction/electrowinning, but with the copper redissolution unit located before a single liquid solid separation circuit.

Figure 6:
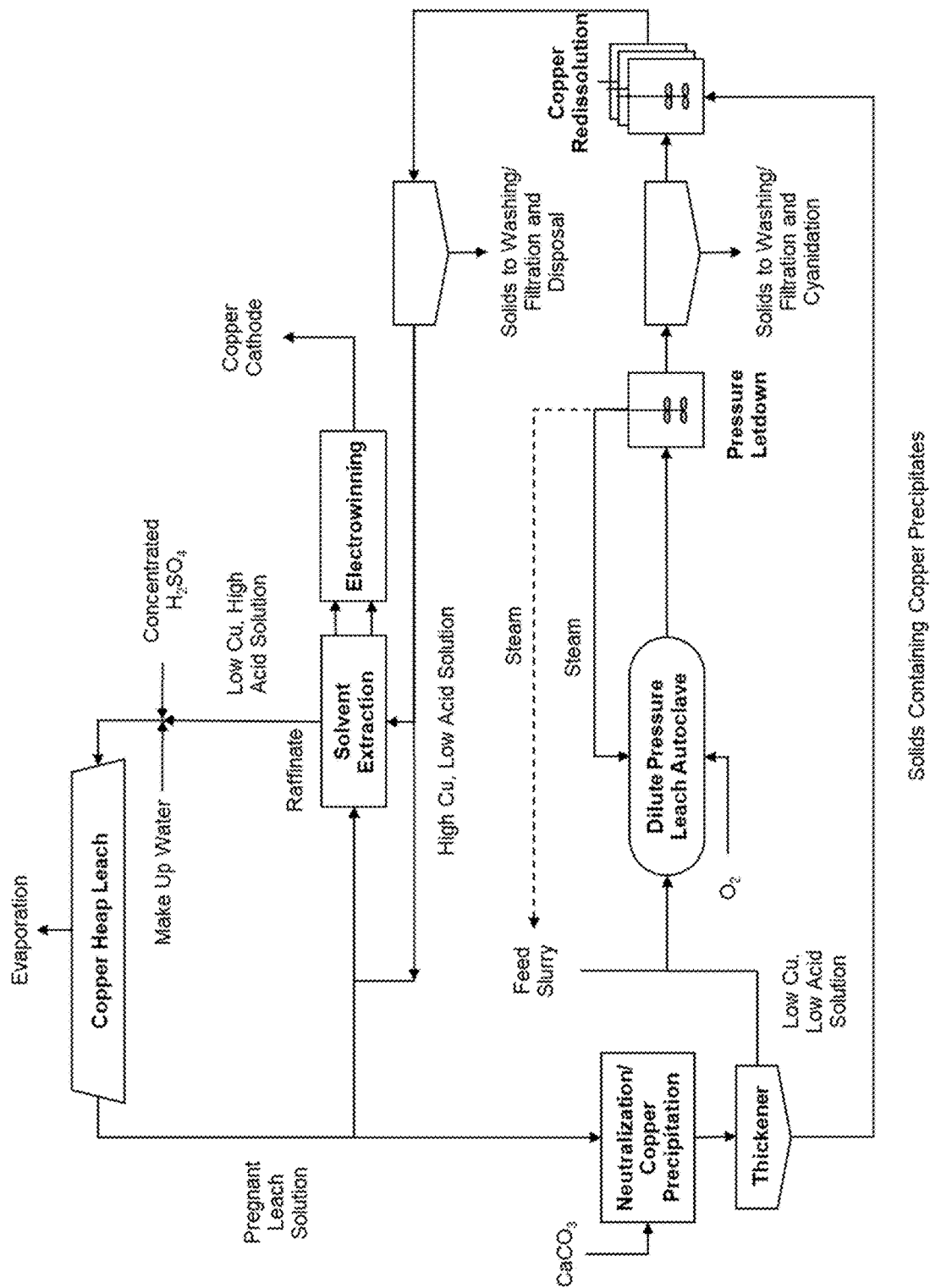

FIG. 6 illustrates an integrated heap leach, pressure oxidative leach process similar to the process of FIG. 4, with copper recovery by solvent extraction and electrowinning, but showing heat recovery of flash steam from the pressure let down/flashing unit. The steam is used to heat the autoclave and optionally to heat the feed slurry to the autoclave.

Figure 7:
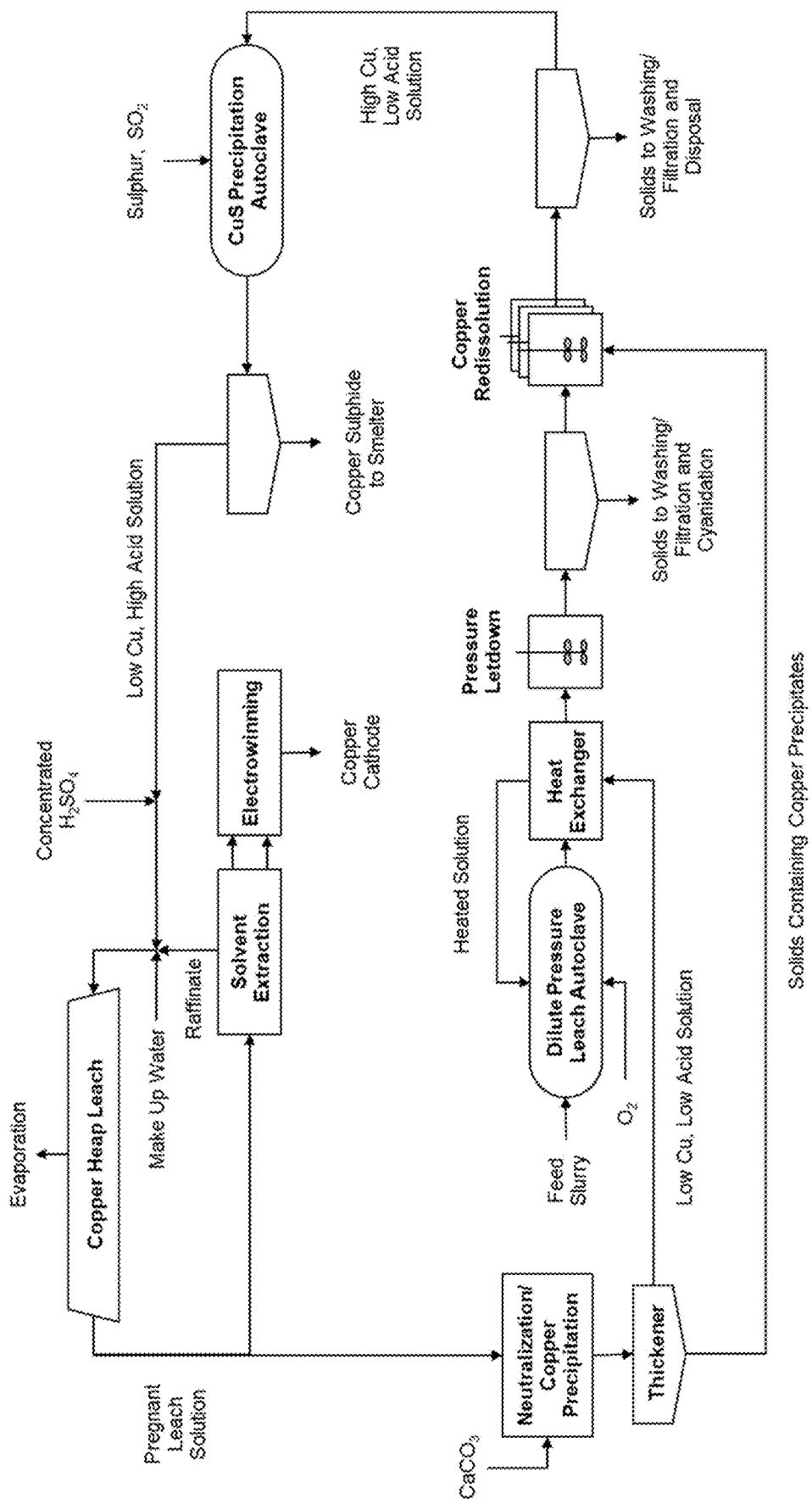

FIG. 7 illustrates an integrated heap leach, pressure oxidative leach process similar to the process of FIG. 4, but with copper recovery of a portion of the heap leach PLS by a solvent extraction/electrowinning circuit and copper recovery from the pressure leach solution by copper sulphide precipitation.

Figure 8:
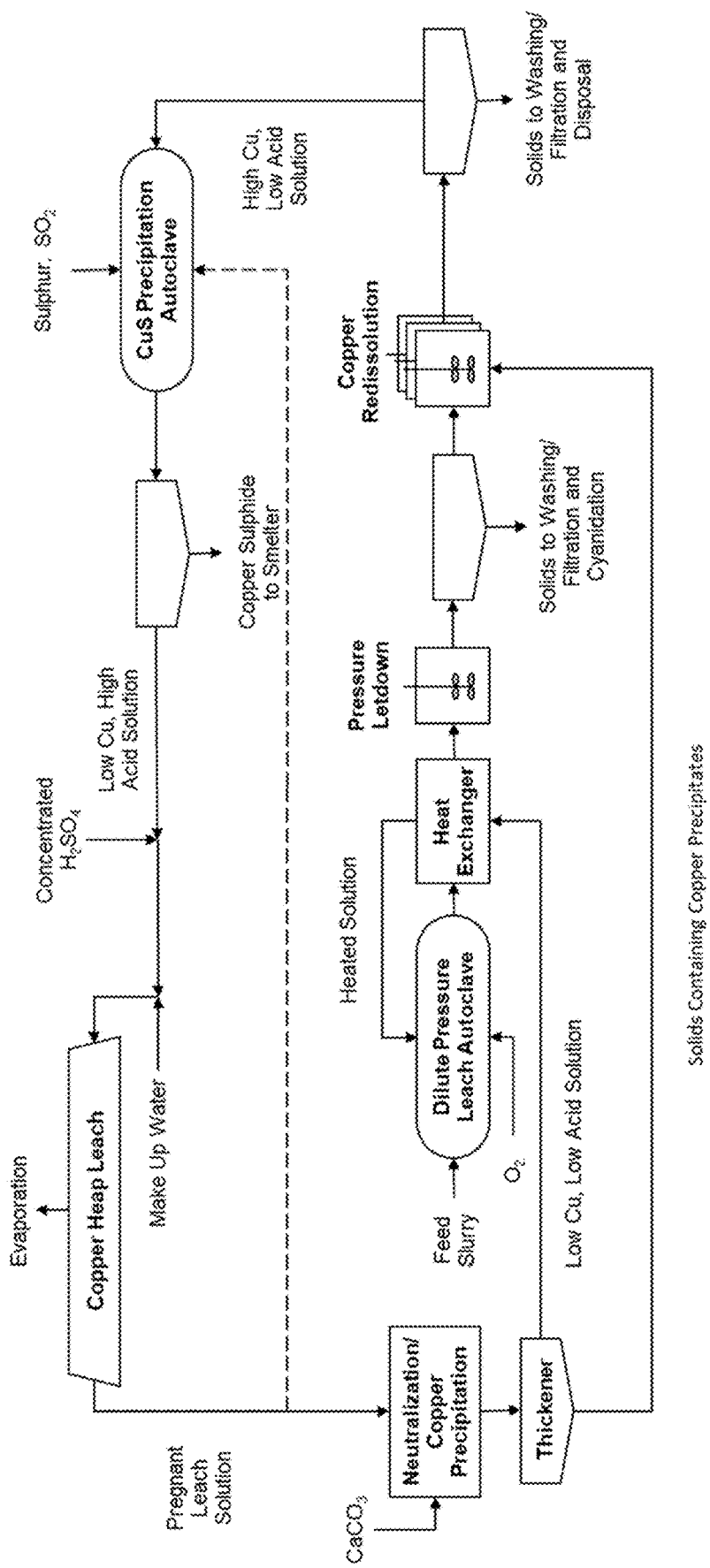

FIG. 8 illustrates an integrated heap leach, pressure oxidative leach process similar to the process of FIG. 4, but with copper recovery from a portion of the heap leach PLS and from the pressure leach solutions being by copper sulphide precipitation.

In some embodiments, the process of this disclosure is practised on sulphidic ores or concentrates containing iron and arsenic, with commercially appreciable amounts of both copper and silver, both of which are recovered. However, it should be understood that the process also has application to sulphidic feeds containing commercially appreciable amounts of copper but without significant arsenic, and to sulphidic feeds containing commercially appreciable amounts of copper, but without commercially appreciable amounts of silver.

a) Copper Heap Leaching

Copper heap leaching (HL) in the heap leach circuit is generally conducted under conditions described in the Background section, with the heap formed from low grade copper ores. The conditions for the copper heap leach circuit may vary, as known in the art, and may include bioleaching to assist in oxidizing sulphide minerals in the heap. In the process of this disclosure, in which the copper heap leach is integrated with pressure leaching, the acidic solution for the heap leach is a low copper, high acid solution from the copper recovery unit, i.e., one or both of the raffinate from solvent extraction and the liquid solution from the copper sulphide precipitation.

A heap leach pregnant leach solution (HL PLS) is recovered from the heap. All or a portion of the HL PLS is fed to a neutralization unit, as described more fully below. A portion of the HL PLS may be treated for copper recovery by solvent extraction. In some embodiments, where copper recovery is by copper sulphide precipitation, a portion of the heap leach PLS may be treated for copper recovery in the copper sulphide recovery circuit.

Impurity elements, such as Al, Fe, Mg, Cl, etc., in the low grade copper ore may dissolve into the HL PLS.

b) Neutralization of Heap Leach Solution to Generate Low Copper, Low Acid Process Solution The low acidity, low solids pressure leach process requires managing the solids content of the pressure vessel to maintain a free acid concentration below 30 g/L. Thus, it is important to have a source of process solution for addition to the pressure vessel that is low in free $H_2SO_4$ (free acid) and low in aluminum and/or iron, which may hydrolyze during pressure leaching and generate acid.

When treating arsenical copper concentrates with pressure leaching, it is also important to have low copper and/or zinc concentrations in this solution since, as shown below in Example 1, copper and/or zinc in the process solution may be precipitated as insoluble precipitates, resulting in the loss of copper and zinc values.

When integrated with a copper heap leach, the supply of process solution to the pressure leach is generated by neutralizing all or a portion of heap leach pregnant leach solution (i.e., equivalent to the volume of process solution required for the pressure leach) to neutralize the acid and precipitate copper as a copper hydroxide ($Cu(OH)_2$) or basic copper sulphate (($Cu(OH)_2)_3.CuSO_4$). Heap leach PLS typically has much lower sulphate concentrations than the pressure leach solutions, which means that a lower amount of sulphate/acid values are lost compared to neutralizing and recycling pressure leach solution as process solution. In this case, the volume of pressure leach solution is only limited by the volume of heap leach solution available, in that all of the heap leach solution could be neutralized and be used as the process solution to the pressure leach.

For complete removal of copper from the heap leach PLS, the neutralizing step is operated above pH 5.5, and preferably between pH 5.5 and 6. Aluminum and iron also precipitate over this pH range, along with a portion of zinc, if present in the solutions. Magnesium in solution does not precipitate below pH 6, and, thus, dissolved magnesium remains in the process solution.

While any strong base which is able to raise the slurry pH to 5.5 or higher may be used to neutralize the heap leach PLS and to precipitate copper values from the heap PLS, the introduction of impurity elements that could build up in solution as the solution is recycled through the heap and pressure leach circuits is detrimental, e.g., sodium from sodium hydroxide or sodium carbonate or ammonium from ammonia addition. Thus, calcium containing bases are preferred for neutralizing agents. Addition of calcium containing bases to a sulphate solution, including both limestone and lime, results in the precipitation of both calcium and sulphate from the solution as gypsum. Limestone is preferred as the primary neutralizing agent, due to its cost and availability. Commercial limestone often contains magnesium as an impurity. High quality commercial limestone can adjust the solution pH to pH 5.5 to 6.5, with lower purity samples achieving lower pH. Thus, lime or slaked lime may be used in some embodiments to maintain the target pH range of pH 5.5 to 6.

The low acid, low copper solution is then separated from the neutralization solids, which include gypsum and the copper and other metal precipitates, using a thickener or other liquid solids separator. The solution is used as process solution in the pressure leach and the underflow slurry is recycled to a copper redissolution step to redissolve the contained metal values.

c) Low Acidity, Low Solids Pressure Oxidative Leach

While, in some embodiments, the pressure oxidative leach step can be operated autothermally with ambient quench water, there are advantages to operating this step under low acidity, low solids conditions. These low acidity, low solids conditions are generally taught in Applicant's US Patent Publication 2018/0298466, with modifications for integration with the copper heap leach. One modification is that the low acid, low copper solution from the neutralizing step for the heap leach PLS is recycled as a process solution for the pressure oxidative leach step, for example, by adding this process solution to the pressure vessel with the sulphidic feed to form an aqueous feed slurry. The recycle of this process solution, for example, after heating with heat recovered from the pressure leach discharge slurry, is a convenient way to control the operating temperature of the pressure vessel.

The process feed to the pressure vessel may include one or more feed components, in separate or combined process feed to the autoclave. The sulphidic feed typically contains copper and/or silver in commercially appreciable amounts, with iron and arsenic in varying amounts. Examples of sulphidic feed and other feed components to the pressure oxidative leaching vessel include:
i. Arsenical copper ores or concentrates containing sulphide minerals and optionally containing silver, for example copper-containing sulphide ore or concentrate;
ii. Silver ores or concentrates containing sulphide minerals and optionally containing other precious metals such as gold, and optionally also containing copper; and
iii. Arsenical materials generated from pyrometallurgical treatment of sulphides, such as one or both of roaster dust and a roaster calcine from a pyrometallurgical treatment of a copper ore or concentrate, or process water containing arsenic.

In general, when operating the process with sulphidic feed containing arsenic, for example above 0.5 wt %, the aqueous feed slurry in the pressure oxidative leaching step has a Fe:As mole ratio between about 2:1 and 10:1.

The pressure oxidative leaching step is conducted in a pressure vessel, such as a high pressure autoclave, with oxygen at high temperature and high pressure conditions, as is generally known in the industry. The autoclave may include one or more compartments fitted for agitation and addition of aqueous process solution and oxygen. A multi-compartment autoclave acts as a series of continuous stirred tank reactors with slurry transferring to successive compartments by overflow. Exemplary operating conditions for this step for low solids, low acid conditions are 200 to 230° C., preferably 210 to 230° C., with an oxygen partial pressure of 200 to 1000 kPa, preferably about 500 kPa, and a retention time of 20 and 60 minutes, or preferably between 20 and 30 minutes. For autothermal operation, the conditions are similar, but the retention time is typically 30 to 90 minutes, or preferably 45 to 60 minutes.

The pressure vessel is operated at a low solids content, with the low solids content in the aqueous feed slurry controlling free acid in the pressure leaching step below 30 g/L, for example below 27 g/L, below 25 g/L, or between about 5 to 25 g/L. The low solids content is such that heat generated by oxidizing the aqueous feed slurry provides less than 60% of the heat to maintain the temperature in the autoclave above 200° C. The pressure leaching step proceeds without the need for neutralizing any free acid produced in the autoclave. Heat is added to maintain the temperature in the autoclave above 200° C., for example by adding one or more of heated feed slurry, heated process solution and/or steam. The discharge slurry passes through a pressure letdown system, where heat and/or steam may be recovered from the discharge treated slurry using heat exchanger(s) or flash tank(s). The slurry is letdown to atmospheric pressure and a temperature at or below 100° C.

Exemplary embodiments for heat recovery for the autoclave and/or for the incoming feed slurry are shown in the Figures. In general, heated process solution and steam may be added to the autoclave, using direct or indirect heat exchanger(s) to recover heat from the treated slurry leaving the autoclave. Steam may be added to the autoclave, with lower pressure steam recovered in the pressure letdown system as the treated slurry leaves the autoclave. The heat recovery and/or steam can be used to heat one or both of the feed slurry and the process water. The process water may be heated by other sources and fed to the autoclave, while steam is recovered during the pressure letdown system. In still other embodiments, the sulphidic concentrate may be slurried with process water before being added to the autoclave, and heat from the pressure letdown and/or a heat exchanger may be used to heat the process water. Alternatively, the autoclave may be directly heated. The particular choice or configuration for adding heat to the dilute pressure oxidative leaching step will vary for each industrial operation, and will depend on the availability of additional heat sources from other operations and on the degree of retrofitting that can be accommodated in an existing industrial set-up. Arrangements allowing for heat recovery to heat the autoclave are highly preferred so that the amount of additional heat provided from other sources is negligible.

Operating the pressure leach step at low acidity, low solids conditions includes operating at solids contents lower than that required to operate autothermally with ambient quench water, in order to produce a solution composition with low acidity and sulphate concentration. This is made possible by altering the process flow diagrams, as shown in the embodiments of the Figures, and by altering the heat balance for the pressure circuit, for example to incorporate process solution heating and/or heat recovery unit operations to enable higher temperature process solution to be made available to the autoclave.

Operating the pressure leach step at the preferred low acidity, low solids conditions provides advantages compared to autothermal operation, as noted below.

The process reduces the adverse impact of feed arsenic levels on copper extraction, and thereby allows high copper pressure leach extractions to be achieved from arsenical concentrates, concentrate blends and other feed materials that would not otherwise be possible to advantageously treat with other pressure leach processes. The process also reduces the adverse impact of feed arsenic content on the short term stability of the solids (i.e., limiting the redissolution of the solids during temperature and/or pressure letdown prior to solid-liquid separation) and on the long term environmental stability of the solids (i.e., as measured by arsenic in TCLP leachate).

The process allows the mass transfer issues associated with adding oxygen to an autoclave with a highly reactive feed material to be addressed. Oxygen addition in an autoclave is physically limited by the ability to incorporate a sufficient quantity of oxygen into a fixed volume within a given time span. By reducing the pulp density in the autoclave compartments, more oxygen can be transferred to the solution per mass of concentrate, due to the larger solution volume per mass of concentrate treated. Thus, there is the potential to supply enough oxygen to allow shorter autoclave retention times to be used instead of being constrained to operating at longer retention times because of chemical oxygen transfer limitations.

In some embodiments, the process generates more favorable solid precipitates than in a pressure leach operated autothermally with ambient temperature quench water, which provides the following beneficial features (compared to autothermal operation):
i. Less precipitation of copper from solution as Cu—As or Cu—Fe—As precipitates, and, therefore, higher copper recoveries;
ii. Less precipitation of solids, such as argentojarosite, from which silver is not leachable with cyanide unless treated with an intermediate lime boil step, resulting in high silver recoveries without the costs of a lime boil circuit, without the reduced environmental stability of the resulting residues, and without the issues associated with high levels of copper present in solution during cyanidation; and iii. Pressure leach residues which not only pass the EPA TCLP test, in particular in terms of arsenic, but which also pass this test after having been subjected to cyanidation.

The integrated process recovers base metals such as copper and/or precious metals. The process also addresses the environmental disposal/stability of any cyanidation residue. Acid is generated in the pressure leach step and copper is recovered by solvent extraction and electrowinning processes and/or copper sulphide precipitation, both of which generate additional acid values while recovering copper. While some embodiments of the process generate a larger volume of more dilute solution than is generated at higher pulp densities, the lower copper and free acid concentrations in the more dilute solution can improve copper recovery by solvent extraction and electrowinning, compared to treating more concentrated solutions. This, may reduce or avoid the need for dilution of the pressure leach solution with HL PLS prior to copper recovery.

d) Liquid Solid Separation

Liquid-solid separation may be accomplished by a number of different methods, including thickening, filtration, centrifuging or hydrocycloning, or a combination of these methods. Washing of the solid residues is preferably employed to help recover soluble copper values, such as in a countercurrent decantation wash (CCD) thickening circuit, a series of belt and/or pressure filters, and/or a combination of thickening and filtration methods.

e) Precious Metal Recovery

Silver, and other precious metals such as gold, may be recovered from the solid residues from the liquid-solid separation and washing step by direct cyanidation, without an intervening jarosite destruction step such as a lime boil step. The techniques for the cyanide leach step, and for the subsequent recovery of silver and gold from the cyanide solution, are well known in the industry.

Froth flotation can be used to improve overall copper and/or silver recovery. Froth flotation is well known in the minerals industry as a method in which air bubbles are incorporated into a mineral slurry to selectively separate hydrophobic materials from hydrophilic materials. The hydrophobic minerals are collected with the resulting "froth" and the hydrophilic materials remain behind in the mineral slurry. For the pressure leach residue from this process, unleached, residual sulphides that may be present in the pressure leach residue can be selectively recovered from the oxide and gangue minerals present in the residue using froth flotation to produce a copper and/or silver concentrate. This copper/silver concentrate can be recycled to the process or treated for copper and silver recovery in a copper smelter.

In some embodiments of the process, a majority of the silver in a sulphidic feed material can be recovered from a residue produced by pressure leaching, including oxidation of the sulphide sulphur to sulphate to produce an acidic leach liquor, using direct cyanidation, with no other intermediate treatment(s) being needed to destroy jarosites. This is a stark contrast from the majority of acidic pressure leaching or pressure oxidation processes for sulphide concentrates containing silver, as the formation of argentojarosite under those conditions results in residues where silver is not readily recoverable by direct cyanidation. Thus, the ability to produce solids in the pressure oxidative leaching step, from which silver in the feed can be recovered without a lime boil treatment is a major advantage for the integrated process. As well, eliminating the need for lime boil treatment for silver recovery means that the stable phases formed during high temperature pressure leaching can be preserved through cyanidation, resulting in a more stable solid residue after pressure leaching and cyanidation (as measured by arsenic in TCLP leachate).

In addition to pressure leach residue prepared according to this process being amenable to direct cyanidation, the cyanide solution produced is amenable to any of the commercial processes for recovering silver, including carbon adsorption, carbon elution, zinc precipitation, electrowinning and cyanide recovery.

f) Redissolution of Copper and Other Metals from Neutralization Solids

The neutralization solids recovered from the neutralization of the heap leach PLS are reacted with the acidic solution from the pressure leach to dissolve the previously precipitated copper, to dissolve all or a portion of the precipitated aluminum, iron and zinc, and to neutralize all or a portion of the free acid from the pressure leach solution. This produces a solution that is lower in free acid and higher in copper (compared the pressure leach solution) and more amenable to copper recovery by solvent extraction or other methods.

In one embodiment, the neutralization solids are added directly to the pressure leach slurry (treated slurry) before liquid solid separation. The solids that do not dissolve are separated from the liquid phase along with the pressure leach solids, using thickening and/or filtration. The liquid phase is sent to copper recovery, while the solids are either sent for disposal or for precious metals recovery by cyanidation.

In another embodiment, the neutralization solids are added to all or a portion of the pressure leach solution, after separation from the pressure leach solids, using thickening and/or filtration. The solids that do not dissolve are separated from the liquid phase using thickening or filtration in a further liquid solid separation step. The liquid phase is treated to recover copper. The liquid phase is sent to copper recovery, while the solids are sent for disposal or recycled to the pressure leach liquid solid separation steps to recover any entrained copper in these solids.

The copper redissolution step is operated to achieve a pH of less than pH 2.5 to completely dissolve the copper values from the neutralization solids. Operating at a pH less than 1.5 dissolves copper and the majority of the Al, Fe and Zn in the neutralization solids.

If the neutralization solids are added to all or a portion of the pressure leach solution, after separation from the pressure leach solids, the pH may be controlled to give a range of 1.5 to 2.5, if there is value to bleed aluminum or iron from the integrated heap and pressure leach system. In a pH range of 1.5 to 2.5, all the copper redissolves, but only a portion of the iron and aluminum in the neutralization solids dissolves. The solution pH is controlled by adjusting the amount of the solution added to react with the neutralization solids.

g) Copper Recovery

In some embodiments, copper recovery is by solvent extraction/electrowinning, with copper recovered as copper cathode. In other embodiments, copper recovery is by copper precipitation as copper sulphide. In still other embodiments, both copper recovery methods may be used.

i. Solvent Extraction/Electrowinning

Copper may be recovered from the solution by solvent extraction using organic copper solvent extraction reagents, such as Acorga® reagents produced by Solvay S.A. or LIX® reagents produced by BASF, are typically made up of ketoximes, aldoximes or mixtures of the ketoximes and aldoximes. These reagents are combined with a diluent and then contacted with the solution in liquid-liquid mixers and settlers to allow the organic and aqueous phases to separate. Solvent extraction may contain one or more extraction, washing, scrubbing or stripping stages (i.e., one stage=one mixer-settler pair) in one or more trains (i.e., series of mixer settlers) depending on the concentration of copper and free acid in the solutions and the flow rates of organic and aqueous required.

Solvent extraction typically operates at temperatures less than 50° C., and, thus, the feed solution is cooled before recovering copper. The feed solution may also be saturated in calcium, following the redissolution of the neutralization solids. Calcium can lead to crud formation (e.g., gypsum precipitation), problems with phase disengagement, or other problems in solvent extraction. Cooling the solution can be also be used to precipitate and remove calcium as gypsum before solvent extraction.

Cooling can be accomplished in a number of ways. In some embodiments, a cooling tower is used to cool the solution (e.g., to 20 or 30° C.) and precipitate gypsum in a single unit operation. The solution is then reheated (e.g., to 30 to 40° C.) with an indirect heat exchanger either with steam or with the incoming feed solution.

Loading of copper on the organic extractant, R, occurs by the reaction set out below. Impurity elements are not loaded and report to the raffinate solution. The raffinate solution is then sent to the heap leach, where the acid values in solution are used for leaching additional copper values in the heap.

$$2H\text{—}R + CuSO_4 = Cu\text{-}2R + H_2SO_4$$

Copper is then stripped with spent electrolyte from electrowinning to regenerate the organic extractant, by the following reaction, and the electrolyte is treated in electrowinning to recover copper as cathode.

$$Cu\text{-}2R + H_2SO_4 = 2H\text{—}R + CuSO_4$$

If only a portion of the heap leach solution is neutralized to provide process solution for the low solids pressure leach, separate solvent extraction trains may be operated to recover copper from the heap leach and to recover copper from the solution from pressure leaching.

ii. Copper Sulphide Precipitation

In some embodiments, following the above steps, the copper and/or free acid concentration in the feed solution to copper recovery may be high enough that solvent extraction does not result in high copper recoveries, for example >90%, and preferably >95%. In such embodiments, copper can be precipitated in agitated pressure vessel(s) by using elemental sulphur and a partial pressure of sulphur dioxide gas. Copper is precipitated as a copper sulphide and acid values are generated in solution. This precipitation process is selective to copper over arsenic, producing a copper sulphide with very low levels of arsenic, even from leach solutions with elevated arsenic concentrations.

The following is an example of the reactions taking place in these vessels.

$$CuSO_4 + S + SO_2 + 2H_2O = CuS + 2H_2SO_4.$$

This example reaction produces two moles of acid per mole of copper recovered, compared to one mole per mole of copper recovered with solvent extraction. In practice, the amount of acid generated typically varies between 1.8 and 2.5 mol $H_2SO_4$:mol copper precipitated.

Copper sulphide precipitation is operated at 80 to 110° C. and preferably 100 to 110° C. The feed solution does not need to be cooled, but heating of the solution may be required. This may be accomplished by using an indirect heat exchanger, using the autoclave discharge and/or steam to heat the incoming solution, or by direct steam addition to the solution. Sulphur dioxide is added to give a partial pressure of sulphur dioxide of 50 to 300 kPa, and preferably between 150 and 300 kPa. Sulphur is added at a sulphur to copper mole ratio of between 1:1 and 2:1. Within this range, higher sulphur additions produce more rapid precipitation kinetics but also increase reagent costs and lower the copper concentration of the copper sulphide product.

A portion of the precipitated copper sulphides may be recycled to the precipitation to allow the unreacted sulphur to react further to produce CuS or for the copper precipitate to react further to generate other copper sulphides (e.g., chalcocite, digenite, djurleite, etc.). This allows the sulphur addition to be lowered and increases the grade of the copper in the sulphide precipitate.

The copper sulphide solids are recovered from the copper precipitation slurry using thickening and/or filtration. The low arsenic copper sulphide solids can be sent to a smelter for recovery of the copper and sulphur values.

The barren solution separated from the copper precipitation slurry is high in acid and can be sent to the heap leach, where the acid values in solution can be used for leaching additional copper values in the heap.

As shown in the Figures, different embodiments may be used in the process, depending on the method of copper recovery used for the heap leach solution. For example, if all of the heap leach PLS is neutralized to provide process solution to the low solids pressure leach, all of the copper is recovered in copper precipitation, and no solvent extraction or electrowinning step is required. If a portion of the heap leach solution is not neutralized to provide process solution for the low solids pressure leach, solvent extraction may be used to recover copper from the heap leach solution. Alternatively, if a portion of the heap leach solution is not neutralized it may be combined with the pressure leach solution, with copper sulphide precipitation used to recover copper from the combined solution.

h) Management of Magnesium and Zinc in Solution

Magnesium may be present in the ore in the heap leach, in heap leach PLS, in the sulphide concentrate and in the limestone neutralizing agent. In some cases, magnesium may be present as magnesium carbonate or magnesium silicates that are not separated from the sulphide minerals during flotation. At least a portion of the magnesium in the concentrate dissolves in the acidic conditions of the pressure leach and reports to the pressure leach solution.

At elevated temperatures, magnesium sulphate dissociates and reacts with hydrogen ions in solution to form bisulphate ions, which effectively reduces the acid concentration in the pressure vessel at the operating temperature. This reaction is reversible; for example, when the pressure vessel is sampled, and the solution cools to room temperature, the bisulphate ions revert to sulphate ions and acid is released back into the solution. As indicated below in Examples 2 and 3, experimentally, this buffering effect can be described by the following reaction:

$$4MgSO_4 + H_2SO_4 = Mg_4(SO_4)_3(HSO_4)_2.$$

To distinguish this effective acidity and the free acid level measured at 20° C., the term "acid concentration at the operating temperature" is used hereinto refer to the condition where bisulphate formation reduces the effective acidity at temperature.

Lower acid concentrations at the operating temperature in the pressure vessel have been shown to provide the following benefits in the low acid, low solids pressure leach, even when operating at the same solids content in the autoclave:

i. Improved copper recovery (i.e., lower losses due to precipitation of copper arsenate) from arsenical copper concentrates:

ii. Improved environmental stability of the pressure leach residues from arsenical copper concentrates;

iii. Higher silver extractions from the pressure leach residues by direct cyanidation.

The process of this disclosure allows for the recycle of magnesium, and the gradual build up of magnesium levels over time. The water balance of the integrated heap and pressure leach operation operates with minimal solution bleed. All or a portion of the magnesium present in gangue minerals in the ore in the heap leach or in the concentrate for the pressure leach may be dissolved during leaching. Magnesium is not precipitated during the neutralization of the heap leach solution nor is magnesium loaded in solvent extraction or precipitated in copper sulphide precipitation. Management of this integrated heap and pressure leach system can control magnesium concentrations to the desired levels to improve copper recovery, environmental stability of the pressure leach residues, or improve silver extractions from the pressure leach residues by direct cyanidation. For example, magnesium can be controlled to a level less than about 30 g/L in the aqueous feed slurry in the pressure oxidative leaching step.

In some embodiments, magnesium can be introduced to the system from other sources to raise the magnesium concentrations in solution. Methods include the addition of magnesium sulphate salts to the process, for example to one or more of the aqueous feed slurry in step a), the treated slurry in step c), the feed solution to step e), the feed solution to step f) and the feed solution to step g). Alternatively, or additionally, magnesium containing neutralizing agents may be added in the heap leach PLS neutralization step f), with exemplary neutralizing agents including dolomitic limestone ($CaMg(CO_3)_2$), magnesium carbonate or magnesium oxide, in addition to limestone. In each case, these materials form magnesium sulphate in solution and increase the soluble magnesium concentration.

If magnesium concentrations are higher than desired to maintain high copper extractions, silver recoveries in cyanidation or residue stability, magnesium can be bled from the system by reacting a portion of the solution from the heap leach neutralization with lime to precipitate magnesium hydroxide. The precipitated solids are separated from the solution, and the lower magnesium solution returned back into the integrated heap and pressure leach system.

Zinc may be present in the sulphide concentrate or in the ore treated in the heap leach, and zinc may also build up in the integrated heap and pressure leach if zinc dissolves in either leaching step. Similar to magnesium, zinc can be bled from the system by reacting a portion of the solution from the heap leach neutralization with lime to precipitate basic zinc sulphate ($3Zn(OH)2.ZnSO4$).

i) Features/Advantages

In some embodiments, the integrated process of this disclosure provides one or more process advantages, including:

i. Integration of low solids pressure leaching of copper concentrates with copper heap leaching to allow the use of the dilute acid produced in the pressure leaching for heap leaching, without negatively impacting the water balance of the integrated heap and pressure leach;

ii. A method for producing a low acid, low copper process solution for the low solids pressure leach, without the loss of copper values from the integrated system;

iii. Recovering copper as high value products from heap and/or pressure leach solutions (i.e., cathode from solvent extraction and/or low arsenic copper sulphide from copper sulphide precipitation);

iv. A method for increasing, recycling and/or managing the magnesium concentration in solution to provide one or more of improved copper recovery or residue stability from arsenical concentrates or improved silver recovery by cyanide leaching; and v. Operation of the pressure oxidative leach without the addition of calcium-based neutralizing agents to the autoclave, which reduces scaling problems in the autoclave, while also leaving acid generated in the pressure leach available for use in the downstream copper heap leach.

Compared to U.S. Pat. Nos. 10,544,482, 5,698,170 and 6,451,088, the size of the pressure leach relative to the heap leach is not limited by the volume of heap leach PLS available to dilute the pressure leach solution for copper recovery by solvent extraction. In the process of this disclosure, the volumetric flow through the pressure leach circuit can be balanced with (i.e., approximately equal to) the volumetric flow through the heap leach circuit.

In some embodiments, copper recovery by copper sulphide precipitation allows the integrated pressure leach and heap leach operation to recover copper as a high value product without needing a SX/EW facility. The acid generated by the pressure leach and in copper sulphide precipitation allows the heap leach facility to be operated to supply all or a portion of the acid required for operating the heap leach. The capital cost of solvent extraction and electrowinning is typically high, and the acid for leaching and power for electrowinning are two of the major operating costs for heap leach operations.

The process of this disclosure does result in losses in acid, due to the neutralization of the heap leach solution and precipitation of sulphate values as gypsum. However, the pressure leach and/or copper precipitation steps generate more acid than is lost by neutralizing the heap leach solution.

Heap leach solutions typically have much lower sulphate concentrations than do pressure leach solutions, which means that a lower amount of sulphate/acid values are lost compared to neutralizing and recycling the same volume of pressure leach solution as process solution.

Heap leach PLS and heap leach raffinate have generally the same sulphur concentration in solution, as there is little to no change in the sulphur concentration through solvent extraction. Because of this, the same amount of acid values are lost by neutralizing the heap leach raffinate or the heap leach PLS. When neutralized, copper, along with ferric and ferrous iron, aluminum, zinc and other metals, which precipitate as metal hydroxides. When added to the pressure leach solution, these hydroxides react with free acid and dissolve as metal sulphates, resulting in a solution with lower acidity. Lower free acid concentrations in the feed to solvent extraction can lead to higher copper recoveries in solvent extraction. Because of the higher copper concentrations in the heap leach PLS compared to the HL raffinate, neutralizing the heap leach PLS produces more hydroxides, which neutralize more of the free acid in the pressure leach solution when these hydroxides are added.

U.S. Pat. Nos. 5,443,622 and 3,218,161 are silent on acid being generated during precipitation of copper sulphides with sulphur and sulphur dioxide. Generation of acid in the le;.4qsystems described in those patents may require neutralization of the solution, which adds to the cost of the process. The advantage of copper sulphide precipitation with sulphur and sulphur dioxide when integrated with a heap leach operation is that the acid generated can be used to supply acid values to the heap leach.

EXAMPLES

Example 1

In pilot plant testing, an arsenical copper concentrate of the following composition was leached in a low solids pressure leach. The composition is shown in Table 1.

TABLE 1

| Analysis of Concentrate A, wt % | | | | | | | | Analysis, g/t | |
|---|---|---|---|---|---|---|---|---|---|
| Al | As | Cu | Fe | Pb | Si | $S^{2-}$ | Zn | Au | Ag |
| 0.78 | 5.11 | 25.2 | 21.3 | 0.31 | 2.26 | 36.6 | 1.66 | 2.4 | 278 |

Synthetic process water (PW) was used as process solution to a four compartment autoclave in Period 1. Synthetic solutions with elevated levels of a number of elements were used in Periods 2 and 3, respectively, to investigate the effect of the process solution composition on the process. This approximates an HL PLS feed to the PL that was not neutralized, according to the process of this disclosure. The composition of these solutions is shown in Table 2.

TABLE 2

| | Average Analysis of Synthetic Process Water Soutions, g/L | | | | | | | | | | |
|---|---|---|---|---|---|---|---|---|---|---|---|
| Solution Type | Al | Ca | Cl | Cu | Fe | Mg | Mn | Na | S | Zn | $H_2SO_4$ |
| Process Water | — | 0.1 | 0.17 | — | — | — | — | 0.1 | — | — | <0.01 |
| Solution 1 | 0.11 | 0.1 | 0.18 | 0.73 | 0.24 | 3.05 | 0.29 | 0.11 | 12.7 | 15.6 | <0.10 |
| Solution 2 | 0.11 | 0.1 | 0.17 | 6.62 | 0.36 | 4.25 | 0.52 | 0.11 | 12 | 3.31 | 1.5 |

Concentrate slurry was continuously fed into the first compartment of an autoclave and reacted with oxygen at elevated temperature and pressure to oxidize sulphide sulphur in the feed to sulphate, to leach copper into solution as copper sulphate and to precipitate arsenic from solution. Process solution was added to the autoclave, after preheating in a shell and tube heat exchanger with steam, to maintain the heat balance, to simulate the preheating of the process solution with the autoclave discharge slurry that would be practiced in a commercial installation. The autoclave operated with four compartments, with the first compartment being three times the size of the subsequent compartments.

The pressure leach circuit was operated under three periods, as shown in the table below, with the major variable being the type of process solution used. All periods operated at 220° C. and 2640 to 2680 kPa(g), with 420 to 460 kPa oxygen partial pressure, with an autoclave retention time of 27 to 29 min. The results for these periods of operation are presented in Table 3.

TABLE 3

| | Period | | |
|---|---|---|---|
| | 1 | 2 | 3 |
| A/C Solid Content[1], wt % | 2 | 2 | 1.9 |
| Process Solution Type | PW | Solution 1 | Solution 2 |
| Process Solution Analysis, g/L Cu | | 0.73 | 6.62 |
| Zn | | 15.6 | 3.31 |
| Equivalent Acid | | 1.2 | 2.7 |
| Overall Copper Recovery, % | 98.3 | 96.1 | 95.4 |
| Overall Zinc Recovery, % | 99.3 | 64.6 | 89.5 |
| Acid in Discharge Solution, g/L | 11.7 | 12.5 | 15.3 |

[1]Solids in autoclave after all process addition, assuming no weight loss due to solids reaction or solution evaporation The recovery of copper and zinc from this concentrate was discovered to drop significantly when process solutions with elevated levels of copper and zinc were fed into the autoclave. It is believed that copper and zinc are leached initially from the concentrate and then precipitated as insoluble copper and/or zinc arsenate precipitates.

The presence of free $H_2SO_4$, and metals, such as Al and Fe, that precipitate at the operating temperature to generate acid, also increases the free acid concentration in the autoclave discharge solution. These higher free acid concentrations also contribute to increased losses of copper as insoluble copper arsenates.

Example 2

Concentrate A from Example 1 was tested in a pilot plant, four compartment, autoclave along with two other concentrates at varying solids concentrations in the pressure leach. The composition of Concentrates B and C are provided in Table 4.

TABLE 4

| | Concentrate Feed Analysis, wt % | | | | | | | | Analysis, g/t | |
|---|---|---|---|---|---|---|---|---|---|---|
| | Al | As | Cu | Fe | Pb | Si | $S^{2-}$ | Zn | Au | Ag |
| Concentrate B | 1.1 | 2.6 | 30 | 21.6 | 0.4 | 2.8 | 34 | 3.1 | 1.6 | 469 |
| Concentrate C | 0.5 | 7.3 | 22 | 23.7 | 0.2 | 1.8 | 42 | 0.3 | 3.2 | 97 |

These three concentrates were tested over a range of solids concentrations and autoclave retention times in sixteen operating periods. All pressure leaching periods operated at 220° C. and 2640 to 2720 kPa(g), with 430 to 500 kPa oxygen. Concentrate slurry was continuously fed into the first compartment of an autoclave and reacted with oxygen at elevated temperature and pressure to oxidize sulphide sulphur in the feed to sulphate, to leach copper into solution as copper sulphate and to precipitate arsenic from solution. Process solution was added to the autoclave, after preheating in a shell and tube heat exchanger with steam, to maintain the heat balance and to simulate the preheating of the process solution with the autoclave discharge slurry that would be practiced in a commercial installation. The autoclave operated with four compartments, with the first compartment being three times the size of the subsequent compartments.

The conditions of those operating periods are provided in Tables 5 and 6, along with the free acid concentration in the autoclave discharge and the gold and silver extractions in the cyanide amenability (CNA) tests.

TABLE 5

| Concentrate Feed | Concentrate A | | | | | | | |
|---|---|---|---|---|---|---|---|---|
| Period No | 1 | 2 | 3 | 4 | 5 | 6 | 7 | 8 |
| A/C Solids Content, wt % | 10.3 | 4.5 | 3 | 3.75 | 6 | 3.3 | 3 | 2 |
| Retention Time, min | 60 | 44 | 45 | 44 | 45 | 35 | 29 | 28 |
| Process Solution Type[1] | PW | PW | PW | PW | PW | PW | PW | PW |
| $H_2SO_4$ in A/C Discharge, g/L | 38.2 | 25.1 | 21.1 | 16 | | 11.6 | 14.4 | 12.5 | 7.9 |
| CNA Extraction, % | | | | | | | | |
| Au | 96.8 | 93.2 | 97.3 | 96.2 | 95.6 | 97.2 | 95.8 | 96.2 |
| Ag | 0.1 | 10.5 | 20.2 | 33.3 | 65.6 | 30.4 | 51.4 | 92.1 |

TABLE 6

| Concentrate Feed | Concentrate B | | | Concentrate C | | | | |
|---|---|---|---|---|---|---|---|---|
| Period No. | 9 | 10 | 11 | 12 | 13 | 14 | 15 | 16 |
| A/C Solids Content, wt % | 2 | 2 | 1.9 | 8.8 | 4 | 2.5 | 1.75 | 1.75 |
| Retention Time, min | 29 | 28 | 27 | 59 | 44 | 44 | 45 | 29 |
| Process Solution Type[1] | PW | S1 | S2 | PW | PW | PW | PW | PW |
| $H_2SO_4$ in A/C Discharge, g/L | 11.7 | 12.5 | 15.3 | 51.9 | 28.5 | 19.1 | 14.2 | 13.2 |
| CNA Extraction, % | | | | | | | | |
| Au | 85.7 | 83.8 | 84.2 | 70.9 | 65.9 | 71.2 | 73.7 | 74.8 |
| Ag | 25.8 | 81.8 | 71.6 | 23.1 | 4.9 | 11.6 | 31.1 | 35.1 |

[1]PW = Process Water, S1 = Solution 1, S2 = Solution 2

Samples of pressure leach discharge slurry were taken from each period and filtered and washed. Cyanide amenability (CNA) leaching tests were performed on each of these samples. The CNA tests were conducted as low pulp density carbon-in-leach tests at ambient temperature for 24 h in 2 L glass bottles, rotating at a small angle on a roller rig. Samples of filter cakes were repulped in water to give a slurry of about 5 to 15% solids and lime slurry was added to the bottles to adjust the pH to between 10.5 and 11.5 before activated carbon and NaCN (3 g/L) were added.

Figure 9:
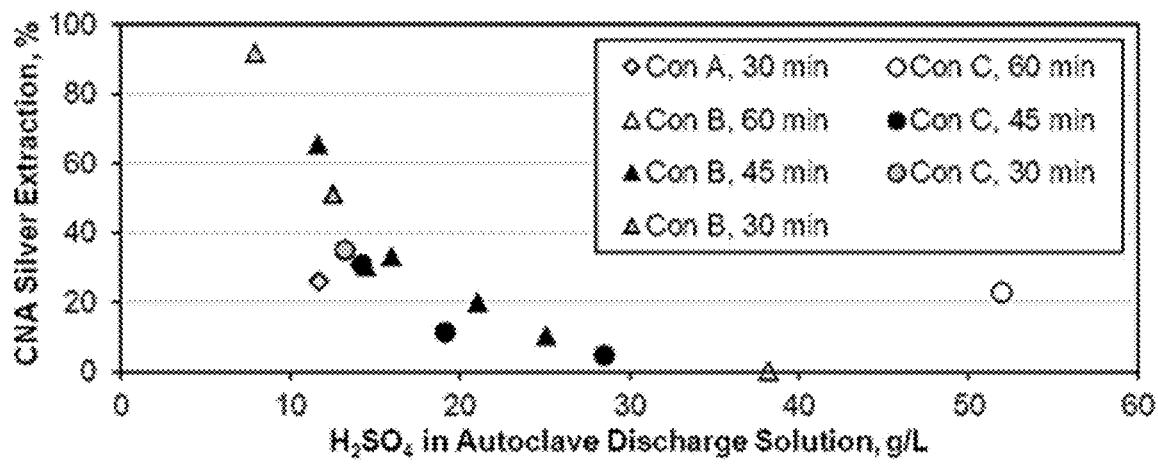
FIGS. 9-22 are graphs showing experimental results described in the examples, which follow.

A relationship was developed between acid in the autoclave discharge solution and the silver extraction by direct cyanidation of the washed pressure leach residues for the tests where process water was used, as shown in FIG. 9. The silver extractions were much higher than predicted by this relationship for Periods 10 and 11 when Concentrate A was leached using Solutions 1 and 2, with elevated levels of various elements, as process solutions.

Figure 10:
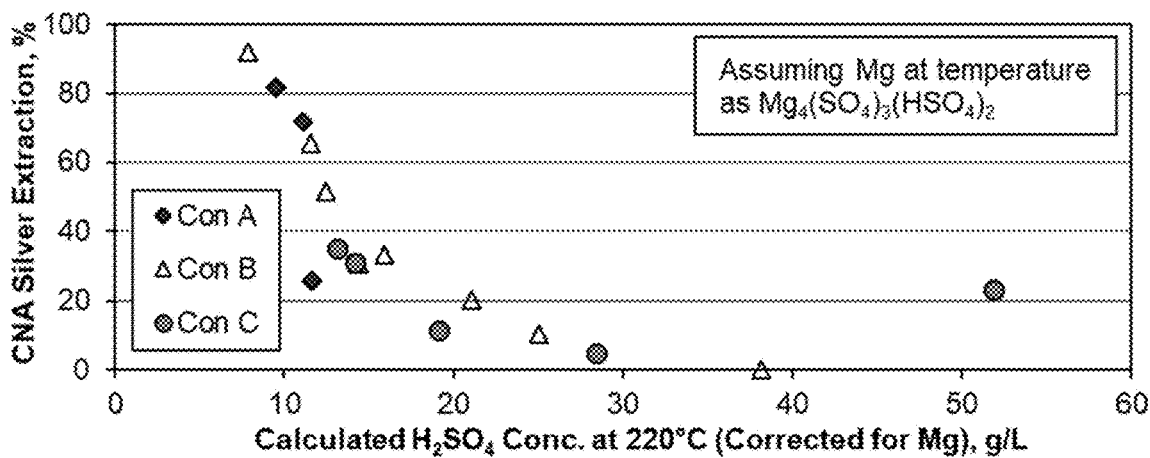

Further investigation pointed towards the formation of magnesium bisulphate ions at the operating temperature. The data from these periods is plotted in FIG. 10 against the calculated acid concentration at the operating temperature, assuming that magnesium is present as $Mg_4(SO_4)_3(HSO_4)_2$ at temperature. With this assumption, these results shows good agreement with the other data points. This example demonstrates a basis for neutralizing the HL PLS fed to the PL step, and for leaving magnesium in solution for process water feed to the autoclave.

Example 3

A series of batch pressure leach tests was performed to investigate the effect of magnesium in the process solution in low solids pressure leaching. In these tests, Concentrate B was added along with process water of the composition indicated in Example 1, in Test 1 and then with process water with 5 and 10 g/L Mg added as $MgSO_4.7H_2O$ in Tests 2 and 3. The tests were performed at 220° C. and 2720 kPa (500 kPa $O_2$ pressure) in a bench scale autoclave at an autoclave solids content of 3 wt %. The conditions and results from these tests are provided in Table 7.

TABLE 7

| | Test No. | | |
|---|---|---|---|
| | 1 | 2 | 3 |
| Mg in Process Solution, g/L | 0 | 5 | 10 |
| Copper Extraction, % | 98.7 | 97.4 | 97.1 |
| Final Solution Analysis, g/L $H_2SO_4$ | 13.9 | 14.2 | 14.8 |
| As | 0.11 | 0.08 | 0.07 |
| CNA Extraction, % | | | |
| Au | 98.4 | 98.3 | 98.3 |
| Ag | 74.1 | 90 | 94.1 |

Figure 11:
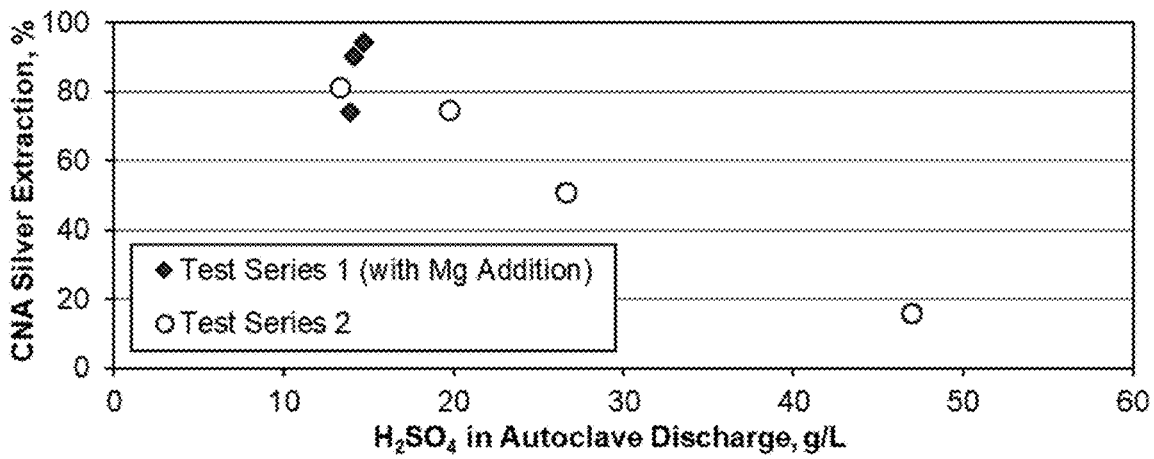

While this test series (Test Series 1) was performed over a limited range of autoclave solids contents, the results are shown for another test series (Test Series 2) on Concentrate B using the same autoclave temperature and oxygen pressure, but where the autoclave solids content varied more widely. FIG. 11 compares the results from Test Series 2 (with magnesium addition) and an earlier test series (Test Series 3). The point from Test 1 (no magnesium added) agrees very well with the relationship between acid in the autoclave discharge and the silver extraction in the cyanide amenability tests, but for Tests 2 and 3, where magnesium was added to the process water, the silver extractions increase without a decrease in the measured free acid concentration.

Figure 12:
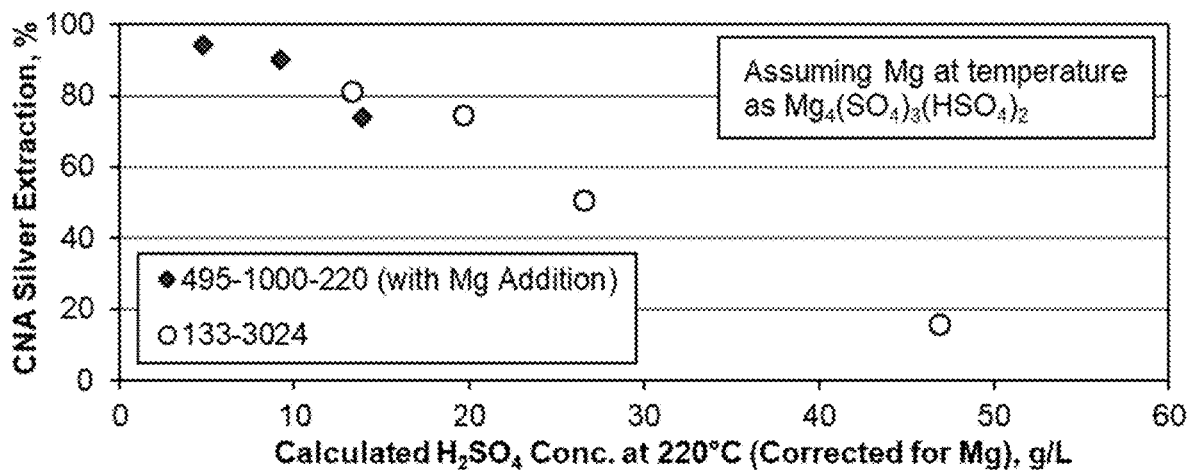

FIG. 12 plots the same data points, but plots the acid concentration at the operating temperature, assuming magnesium is present at temperature as $Mg_4(SO_4)_3(HSO_4)_2$. With this adjustment, the points agree very well with the relationship between acid in the autoclave discharge and silver extraction in cyanidation from the previous example.

This shows the advantage of leaving magnesium in solution during neutralization of the HL PLS in this process, and/or of adding magnesium to the process, for example in the feed to the autoclave.

Example 4

The two solutions of Table 8 were prepared to simulate the composition of heap leach solutions (HL PLS) with low and high concentrations of aluminum and iron.

TABLE 8

Synthetic Heap Leach Solution Analysis, g/L

| | Al | Ca | Cl | Cu | Fe | Mg | Mn | Na | S | Zn | $H_2SO_4$ |
|---|---|---|---|---|---|---|---|---|---|---|---|
| HL Solution 1 | 1.9 | 0.2 | 0.2 | 6.8 | 2.4 | 4.3 | 0.5 | 0.1 | 18 | 3.2 | 4.6 |
| HL Solution 2 | 3.9 | 0.3 | 0.2 | 6.7 | 6.1 | 4.2 | 0.5 | 0.2 | 28 | 3.1 | 4.6 |

Figure 13:
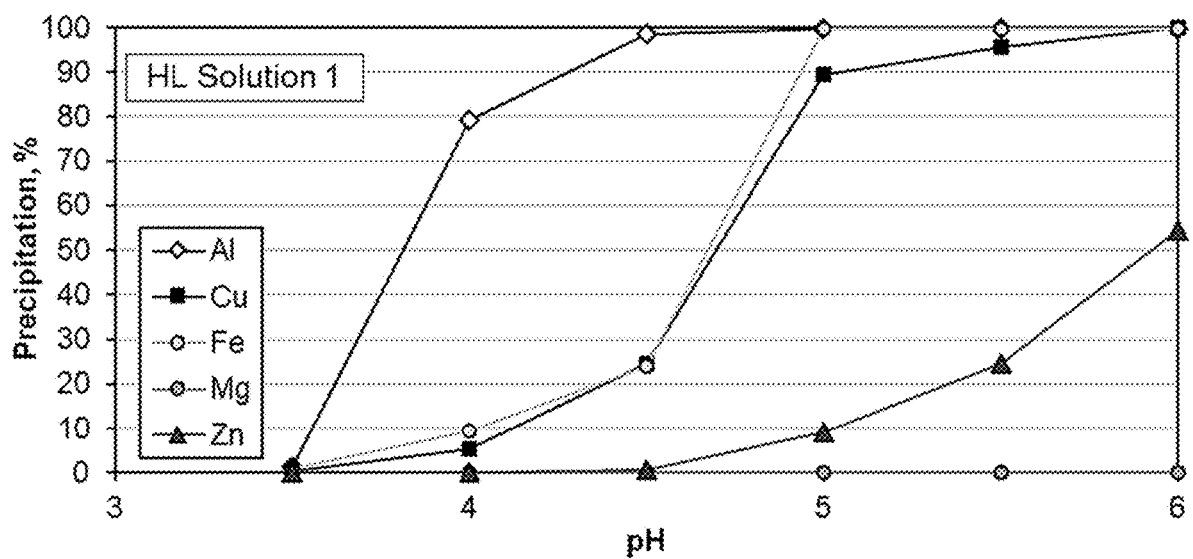
Figure 14:
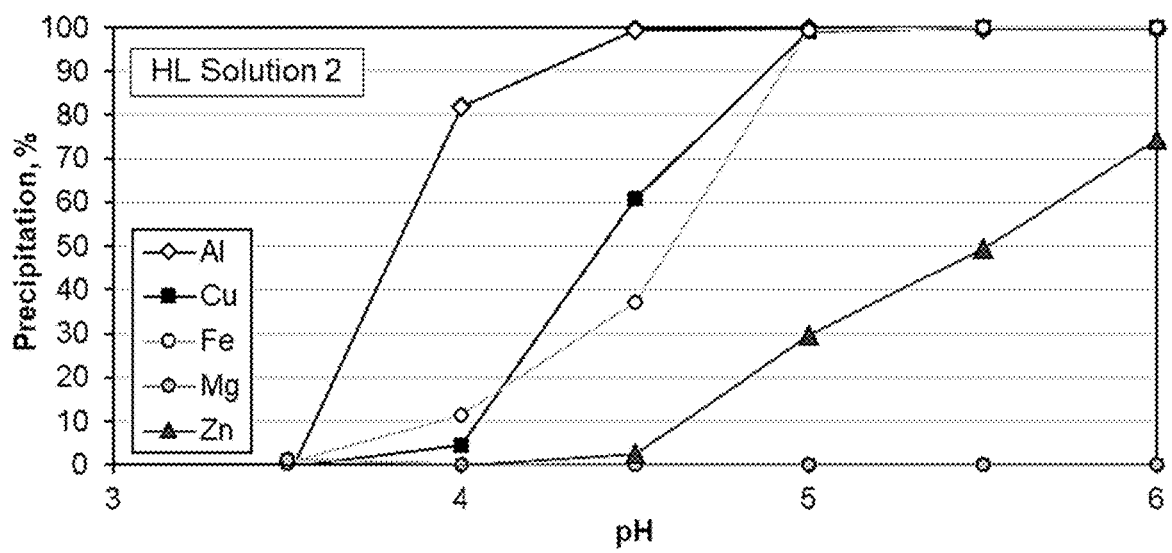

Limestone was added in steps to increase the pH of the solution, to neutralize acid, and to precipitate copper from the solution. As illustrated in FIGS. 13 and 14, as the pH increases, metals hydroxides precipitate, with aluminum precipitating first, followed by iron and copper and then zinc. Over 99.8% of the copper is precipitated between pH 5.5 to 6. Magnesium is not precipitated over the range of pH tested (pH 3.5 to 6). This example supports the use of a neutralization step on heap leach PLS to form a solution further reduced in acid, and solids containing copper precipitates and other metal impurities, while leaving magnesium in solution, and for recycling this solution as process water to a pressure leach step.

Example 5

Two samples of pressure leach (PL) solution, with compositions shown in Table 9, were generated from pilot plant testing. The composition of the solids from Example 4 are provided in Table 10.

TABLE 9

Pressure Leach Solution Analysis, g/L

| | Al | Ca | Cl | Cu | Fe | Mg | Mn | Na | S | Zn | $H_2SO_4$ |
|---|---|---|---|---|---|---|---|---|---|---|---|
| PL Solution 1 | 0.1 | 0.1 | 0.16 | 10.5 | 0.14 | 0.1 | 0 | 0.11 | 10.8 | 1.12 | 14.9 |
| PL Solution 2 | 0 | 0.1 | 0.16 | 5.9 | 0.12 | 0 | 0 | 0.1 | 6.2 | 0.64 | 7.9 |

TABLE 10

Heap Leach Solution Precipitate, wt %

| Feed Solution | Al | Cu | Fe | Zn |
|---|---|---|---|---|
| HL Solution 1 | 0.95 | 2.88 | 0.77 | 0.65 |
| HL Solution 2 | 2.02 | 3.13 | 2.65 | 1.01 |

The acidic PL solutions were added to the solids generated in Example 4 in steps to lower the solution pH and to observe the redissolution of the precipitated solids. Specifically, HL 1 Solids were added to PL Solution 1 and HL 2 Solids were added to PL Solution 2.

Figure 15:
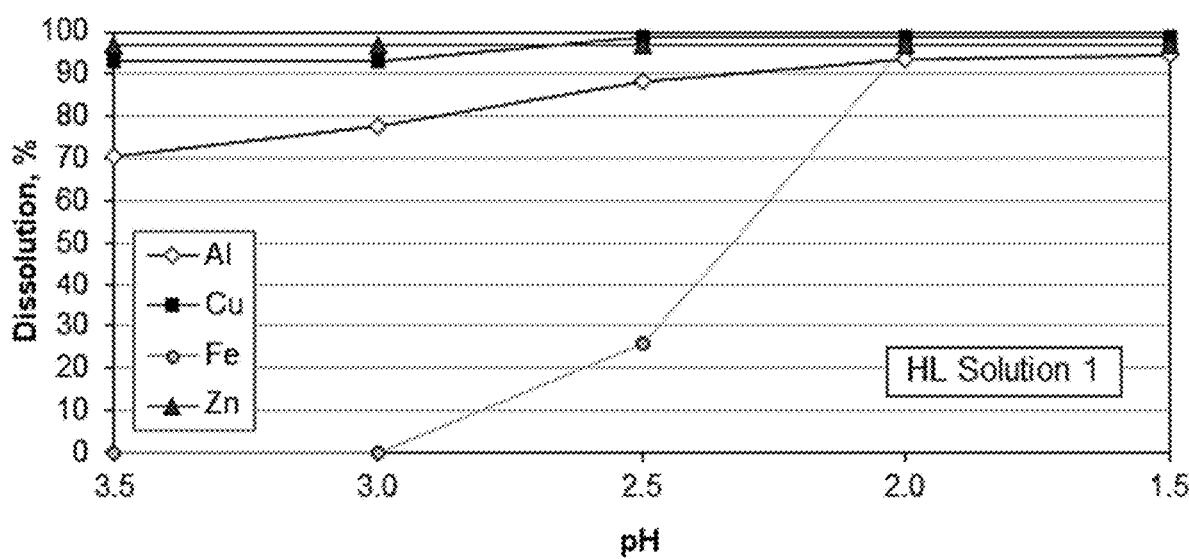
Figure 16:
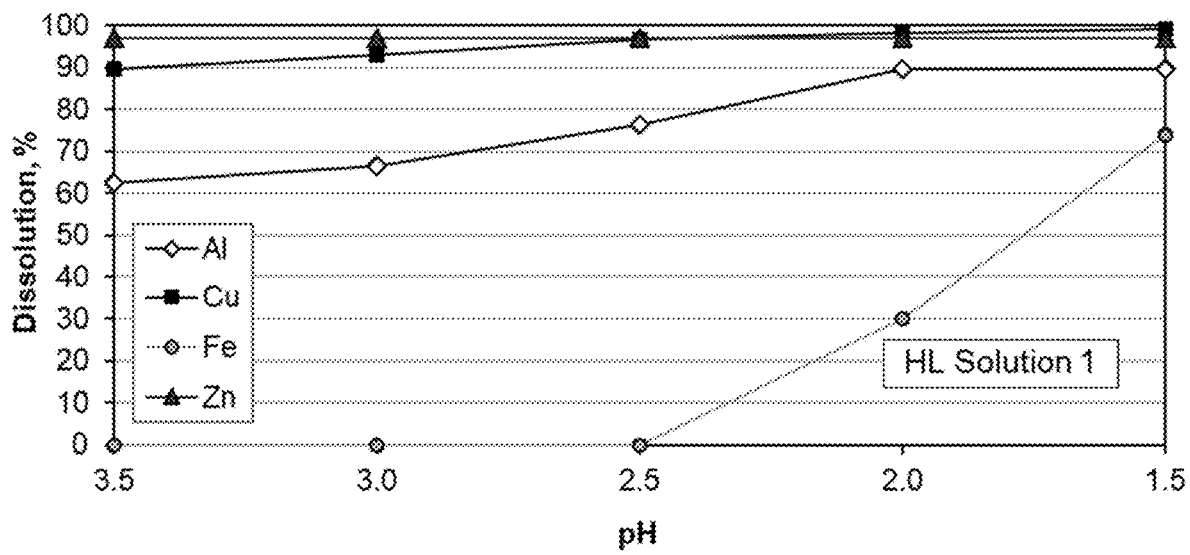

FIGS. 15 and 16 show the extent of redissolution of the solids at each pH level. Zinc in the solids was redissolved at pH 3.5 or lower, while pH values of less than 2.0 or 2.5 were required to dissolve over 99% of the copper values. The flow rate and free acid concentration of PL solution, relative to the mass of neutralization solids produced from heap leach solution, would normally allow for very acidic solutions (i.e., less than pH 1.5) and, therefore, high extents of redissolution of both copper and zinc.

The amount of aluminum dissolved increases gradually as the pH was decreased. Iron redissolution was complete at pH 2 when the low iron HL Solution 1 precipitate was added to PL Solution 1 with a higher free acid concentration, but iron is not redissolved as extensively, even at lower pH (pH 1.5), when the higher iron HL 2 Solids were added to the lower acid PL Solution 2. This differential dissolution of copper relative to aluminum and iron may be used to bleed aluminum and/or iron values in this precipitate in the copper redissolution step of the process.

Example 6

The solution compositions from pilot plant testing of three concentrates where process water (0 g/L $H_2SO_4$, 0 g/L Cu) was used as the process solution were used as the basis for solvent extraction (SX) modeling (Table 11).

TABLE 11

| | Autoclave | PL Solution Composition, g/L | |
|---|---|---|---|
| Concentrate Type | Solids, wt % | Cu | $H_2SO_4$ |
| Concentrate B | 2 | 5.5 | 8.2 |
| Concentrate A | 2 | 4.8 | 10.8 |
| Concentrate C | 1.8 | 4.2 | 14.8 |
| Concentrate B | 3 | 9.7 | 14.4 |
| Concentrate A | 3 | 7.2 | 16.2 |
| Concentrate C | 2.5 | 6.2 | 19.8 |

Because of the high copper and/or acid levels in these solutions, an extra extraction (E) stage was used, with two stripping stages (S), (3 extraction+2 stripping (3+2)) in the modelling, instead of the 2E+2S configuration used in many copper heap leach operations. The modelling used the following parameters:

Organic Extractant: ACORGA M5640 30 vol %,
O:A Ratio=1:1;
95% stage efficiency;
Strip solution with 35 g/L Cu and 200 g/L $H_2SO_4$; and
Advance electrolyte containing 45 g/L Cu.

Table 12 shows the copper and free acid concentrations after redissolution of the gypsum/hydroxide precipitates. A heap leach solution containing 6.55 g/L Cu and 2 g/L $H_2SO_4$ was used as the basis of these neutralization/dissolution cases.

TABLE 12

| | Autoclave | Solution after Hydroxide Releach, g/L | |
|---|---|---|---|
| Concentrate Type | Solids, wt % | Cu | $H_2SO_4$ |
| Concentrate B | 2 | 12.1 | |
| Concentrate A | 2 | 11.4 | 0.7 |
| Concentrate C | 1.8 | 10.8 | 4.7 |
| Concentrate B | 3 | 16.3 | 4.3 |
| Concentrate A | 3 | 13.8 | 6.1 |
| Concentrate C | 2.5 | 12.8 | 9.7 |

For the purposes of this example, it was assumed that the solution did not contain aluminum or iron. The presence of either element in the heap leach solution would produce more hydroxides during neutralization and would, therefore, result in lower the free acid concentrations after redissolution. In all cases, that should improve copper recovery in solvent extraction.

Tables 13 and 14 show the results of solvent extraction modelling for the PL solutions where the autoclave solids was between 1.8 and 2.0 wt %. For the undiluted PL solution, the copper recovery in solvent extraction decreases from over 95% to less than 91% A as the copper concentration in the SX feed decreases and/or the free acid concentration in the SX feed increases. When the same PL solution is reacted with hydroxides precipitated from the heap leach solution, copper recoveries of over 95% are possible for all three cases.

TABLE 13

| | Undiluted Pressure Leach Solution as SX Feed | | | | |
|---|---|---|---|---|---|
| | SX Feed, g/L | | Raffinate, g/L | | SX Copper |
| PL Feed | Cu | $H_2SO_4$ | Cu | $H_2SO_4$ | Recovery, % |
| Con B (2 wt %) | 5.5 | 8.2 | 0.24 | 16.3 | 95.6 |
| Con A (2 wt %) | 4.8 | 10.8 | 0.28 | 17.8 | 94.2 |
| Con C (1.8 wt %) | 4.2 | 14.8 | 0.39 | 20.7 | 90.7 |

TABLE 14

| | PL Solution after Hydroxide Dissolution as SX Feed | | | | |
|---|---|---|---|---|---|
| | SX Feed, g/L | | Raffinate, g/L | | SX Copper |
| PL Feed | Cu | $H_2SO_4$ | Cu | $H_2SO_4$ | Recovery, % |
| Con B (2 wt %) | 12.1 | <0.1 | <0.50 | 18 | >95.9 |
| Con A (2 wt %) | 11.4 | 0.7 | 0.38 | 17.7 | 96.7 |
| Con C (1.8 wt %) | 10.8 | 4.7 | 0.53 | 20.5 | 95.1 |

Tables 15 and 16 show the results of solvent extraction modelling for the PL solutions where the autoclave solids was between 2.5 and 3.0 wt %. With higher copper and free acid concentrations in these solutions, copper recovery by solvent extraction drops off significantly for both the undiluted PL solution and for the PL solution after hydroxide redissolution.

Thus, when operating at higher solids contents in the pressure leach autoclave, solvent extraction may not be a preferred method for copper recovery with significant dilution of the solution with heap leach PLS, due to these lower recoveries and/or the high recirculating load of copper being recycled to the heap. In these cases, copper recovery by copper sulphide precipitation (Example 7) may be a better alternative.

TABLE 15

| | Undiluted Pressure Leach Solution as SX Feed | | | | |
|---|---|---|---|---|---|
| | SX Feed, g/L | | Raffinate, g/L | | SX Copper |
| PL Feed | Cu | $H_2SO_4$ | Cu | $H_2SO_4$ | Recovery, % |
| Con B (3 wt %) | 9.7 | 14.4 | 1.05 | 27.7 | 89.2 |
| Con A (3 wt %) | 7.2 | 16.2 | 0.72 | 26.2 | 90.0 |
| Con C (2.5 wt %) | 6.2 | 19.8 | 0.82 | 28.1 | 86.8 |

TABLE 16

| | PL Solution after Hydroxide Dissolution as SX Feed | | | | |
|---|---|---|---|---|---|
| | SX Feed, g/L | | Raffinate, g/L | | SX Copper |
| PL Feed | Cu | $H_2SO_4$ | Cu | $H_2SO_4$ | Recovery, % |
| Con B (3 wt %) | 16.3 | 4.3 | 3.75 | 23.7 | 77.0 |
| Con A (3 wt %) | 13.8 | 6.1 | 1.92 | 24.4 | 86.1 |
| Con C (2.5 wt %) | 12.8 | 9.7 | 1.79 | 26.7 | 86.0 |

Example 7

Two samples of pressure leach solutions generated from pilot plant testing were used as the feed solution to these tests, with the compositions listed in Table 17.

TABLE 17

| | Pressure Leach Solution Analysis, g/L | | | | | | | | |
|---|---|---|---|---|---|---|---|---|---|
| | Al | As | Ca | Cu | Fe | Mg | S | Zn | $H_2SO_4$ |
| PL Solution 1 | 0.01 | 0.18 | 0.05 | 14.5 | 1.86 | 0.02 | 16.1 | 0.1 | 22.1 |
| PL Solution 2 | 0.01 | 0.02 | 0.05 | 4.8 | 0.23 | 0.02 | 6.6 | 0.34 | 11.1 |

The tests were conducted in a laboratory autoclave with $SO_2$ added on demand to maintain a constant operating pressure. PL Solution 1 or PL Solution 2) was added along with elemental sulphur and heated to the target temperature before the $SO_2$ was added. For some tests, $CuSO_4.5H_2O$ was added to increase the concentration of copper to 21.0 g/L in PL Solution 1 and 8.3 g/L for PL Solution 2. Rate samples were collected to determine the extent of copper precipitation with time. The conditions for these tests are shown in Table 18.

TABLE 18

| Test No. | 1 | 2 | 3 | 4 | 5 | 6 | 7 | 8 |
|---|---|---|---|---|---|---|---|---|
| PL Solution | 2 | 1 | 1 | 1 | 1 | 1 | 1 | 2 |
| Cu, g/L | 8.3 | 14.5 | 14.5 | 14.5 | 14.5 | 14.5 | 21.0 | 4.8 |
| Temperature, °C. | 110 | 110 | 110 | 100 | 80 | 100 | 110 | 110 |
| $SO_2$ Pressure, kPa | 75 | 100 | 200 | 120 | 220 | 120 | 180 | 180 |
| S:Cu Mole Ratio | 2.0 | 2.0 | 1.9 | 1.9 | 1.9 | 1.5 | 2.0 | 2.0 |

Figure 17:
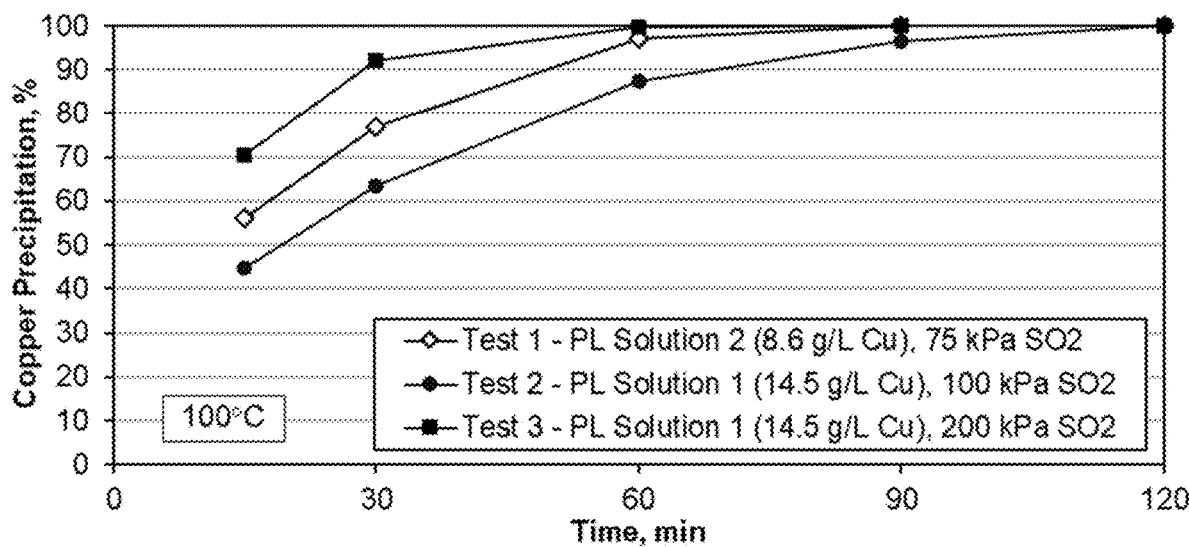

FIG. 17 shows the rate of copper precipitation at 100° C. Copper precipitation is rapid from solutions with lower copper concentrations as illustrated in Test 1, where copper precipitation was complete from a feed solution with 8.3 g/L copper in 90 min, even using relatively low $SO_2$ pressures. At this temperature, the $SO_2$ pressure had to be increased to achieve a similar rate of reaction for solutions with higher concentrations of copper (Test 3).

Figure 18:
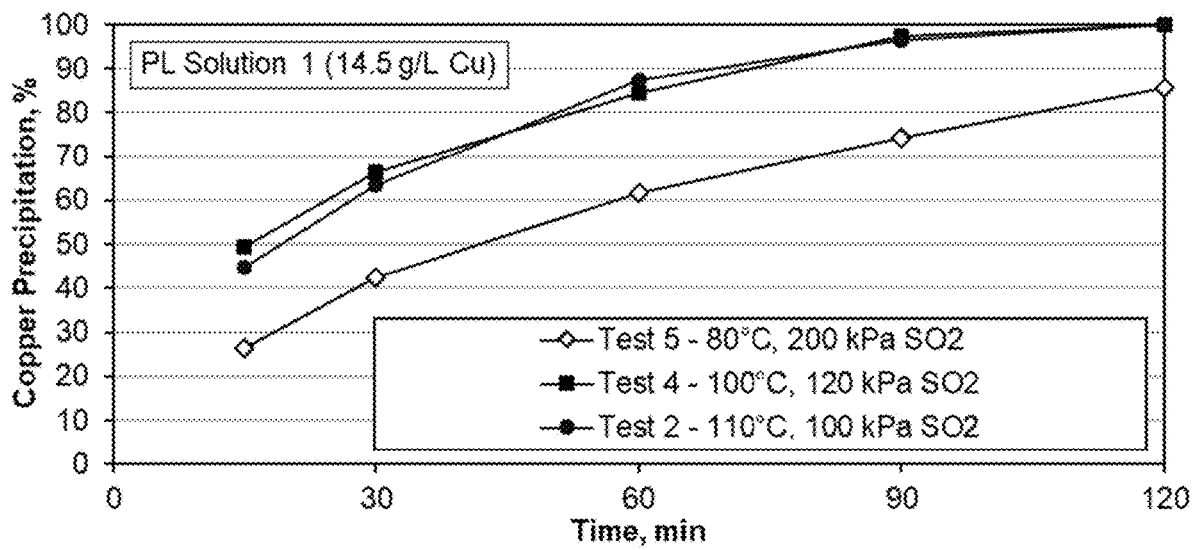

FIG. 18 shows similar rates of precipitation at 100 and 110° C. At 80° C., copper still precipitates, but the rate of precipitation is much slower.

Figure 19:
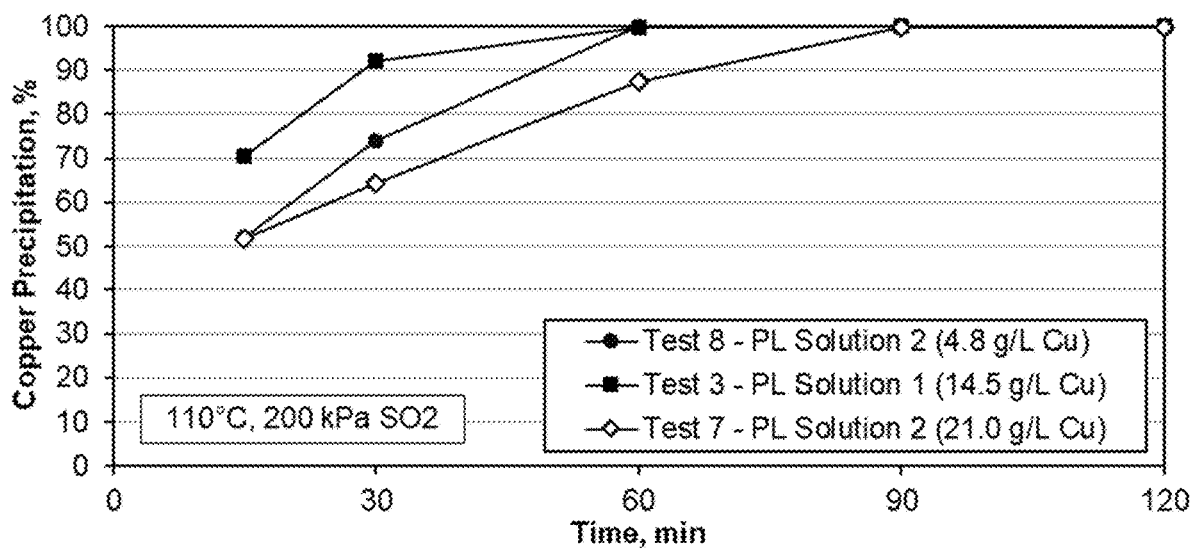

FIG. 19 shows the effect of copper concentration in the feed solution on precipitation rate at 110° C. and 200 kPa $SO_2$ pressure. Essentially all of the copper is precipitated within 60 min for solutions with less than 14.5 g/L Cu, while 90 minutes was required to get to similar levels of precipitation with a feed solution with 21.0 g/L Cu.

Figure 20:
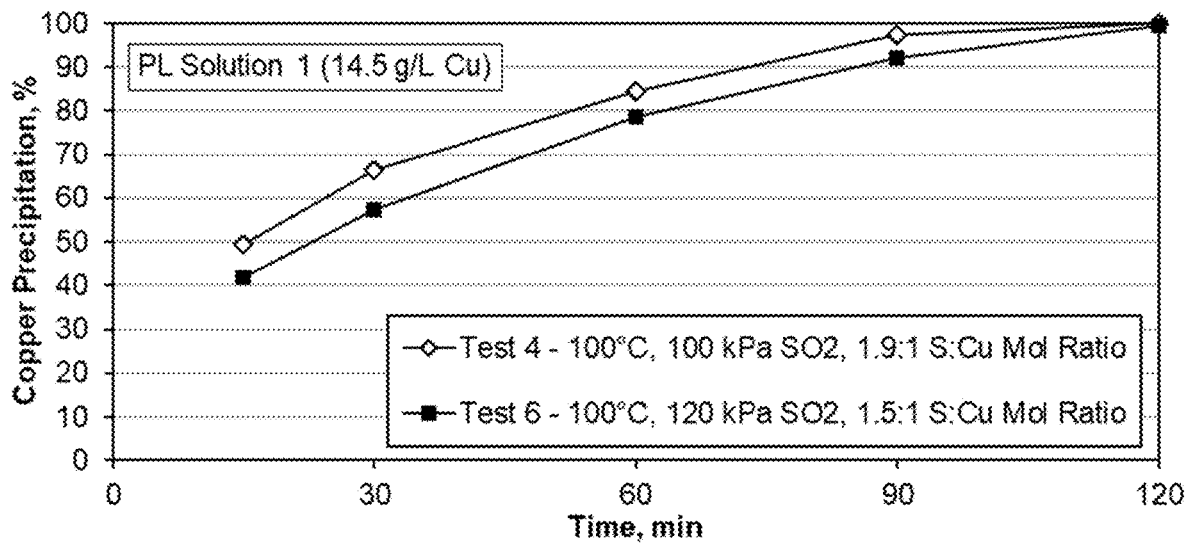

FIG. 20 shows the effect of sulphur:copper mole ratio on copper precipitation. The rate of copper precipitation slightly slower with lower sulphur additions, but effectively all of the copper in solution was precipitated within 120 minutes in both tests.

Table 19 shows the free acid concentrations in the feed solution and in final solution after precipitation. In each test, between 1.8 and 2.6 moles of acid are generated per mole of copper precipitated, compared to 1 mole of acid per mole of copper with copper recovery by solvent extraction.

TABLE 19

| Test No. | 1 | 2 | 3 | 4 | 5 | 6 | 7 | 8 |
|---|---|---|---|---|---|---|---|---|
| Free $H_2SO_4$, g/L | | | | | | | | |
| Feed | 11.1 | 21.1 | 21.1 | 21.1 | 21.1 | 21.1 | 21.1 | 11.1 |
| Final Solution | 38.9 | 71.2 | 73.0 | 70.2 | 70.2 | 61.5 | 87.1 | 27.2 |
| Acid Generated | | | | | | | | |
| Acid:Cu Mole Ratio | 2.2 | 2.2 | 2.3 | 2.2 | 2.6 | 1.8 | 2.0 | 2.2 |

Table 20 shows the analyses of the copper precipitates from these tests. For S:Cu mole ratios of 1.9 to 2.0, the copper concentrations were typically between 49 and 50 wt % Cu and 49 to 50 wt % S. Operating at a lower S:Cu mole ratio produced a higher grade material (56 wt % Cu, 44 wt % S). Similarly, the copper grade in the copper precipitate would be expected to increase when copper precipitates are recycled to the autoclave.

TABLE 20

| Test No. | 1 | 2 | 3 | 4 | 5 | 6 | 7 | 8 |
|---|---|---|---|---|---|---|---|---|
| Temperature, ° C. | 110 | 110 | 110 | 100 | 80 | 100 | 110 | 110 |
| S:Cu Mole Ratio | 2 | 2 | 1.9 | 1.9 | 1.9 | 1.5 | 2 | 2 |
| Precipitate Analysis, wt % | | | | | | | | |
| Cu | 49.6 | 50.6 | 51 | 50.2 | 46.6 | 56.1 | 50.1 | 50 |
| As | <0.03 | <0.03 | <0.03 | <0.03 | <0.03 | <0.03 | <0.03 | <0.03 |
| S | 50.2 | 49.2 | 48.8 | 49.6 | 53.1 | 43.7 | 49.7 | 49.8 |
| Zn | 0.26 | 0.27 | 0.27 | 0.26 | 0.23 | 0.29 | 0.26 | 0.27 |

In each test, the precipitates contained less than the ICP detection limit of 0.03 wt % As. The resulting copper sulphide precipitate would be a high value product that could be treated directly in a copper smelter for copper and sulphur recovery.

Example 8

The following example examines the acid balance for the integrated heap leach, pressure leach process after incorporating the embodiments of this disclosure from Examples 4-7. The heap leach solution from Example 6 (6.55 g/L Cu, 2 to 6 g/L $H_2SO_4$) is used as the basis for this example. Copper recovery from this heap leach solution without incorporating embodiments of this disclosure would be of 97.1% (0.22 g/L Cu in raffinate). Neutralization of this heap leach solution would result in the loss of between 1.9 and 2.6 t $H_2SO_4$/t of heap leach copper, due to the loss of sulphate associated with the free acid and the copper values in this solution. The copper and free acid concentrations in solution after pressure leaching and releaching the copper values from the hydroxide precipitate from Example 6 are presented in Table 21, along with the free acid concentrations in the raffinate from Example 6 and the calculated free acid concentration after copper sulphide precipitation, assuming 98% copper precipitation and the generation of 2 moles of acid per mole of copper recovered.

TABLE 21

| Concentrate Type | Autoclave Solids, wt % | PL Solution After Hydroxide Releach, g/L | | Acid after Copper Recovery, g/L | |
|---|---|---|---|---|---|
| | | Cu | $H_2SO_4$ | SX Raffinate | CuS Precip. |
| Concentrate B | 2 | 12.1 | | 18.0 | 36.6 |
| Concentrate A | 2 | 11.4 | 0.7 | 17.7 | 34.5 |
| Concentrate C | 1.8 | 10.8 | 4.7 | 20.5 | 32.7 |
| Concentrate B | 3 | 16.3 | 4.3 | 23.7 | 49.3 |
| Concentrate A | 3 | 13.8 | 6.1 | 24.4 | 41.7 |
| Concentrate C | 2.5 | 12.8 | 9.7 | 26.7 | 38.7 |

Tables 22 and 23 show the net amount of acid reporting to the heap leach in the raffinate, after subtracting the equivalent acid loss from neutralization for each case. In each case, more acid is available for heap leaching than is lost during neutralization of the heap leach solution.

TABLE 22

| Concentrate Type | Autoclave Solids, wt % | Net Acid Credit t/t HL Cu (2 g/L $H_2SO_4$ in HL Solution) | |
|---|---|---|---|
| | | Solvent Extraction | CuS Precipitation |
| Concentrate B | 2 | 0.9 | 3.9 |
| Concentrate A | 2 | 0.9 | 3.5 |
| Concentrate C | 1.8 | 1.3 | 3.2 |
| Concentrate B | 3 | 1.8 | 5.8 |
| Concentrate A | 3 | 1.9 | 4.7 |
| Concentrate C | 2.5 | 2.3 | 4.2 |

TABLE 23

| Concentrate Type | Autoclave Solids, wt % | Net Acid Credit t/t HL Cu (6 g/L H$_2$SO$_4$ in HL Solution) | |
|---|---|---|---|
| | | Solvent Extraction | CuS Precipitation |
| Concentrate B | 2 | 0.3 | 3.2 |
| Concentrate A | 2 | 0.3 | 2.9 |
| Concentrate C | 1.8 | 0.7 | 2.6 |
| Concentrate B | 3 | 1.2 | 5.2 |
| Concentrate A | 3 | 1.3 | 4.0 |
| Concentrate C | 2.5 | 1.7 | 3.6 |

The acid requirement for heap leaching of copper oxides and/or secondary sulphides is typically on the order of 2.5 to 4 t acid/t heap leach copper, and, thus, depending on the size of the pressure leach circuit, relative to the size of the heap leach circuit and the method of copper recovery chosen, the embodiments of this disclosure may be able to provide all, or a portion, of the acid required for heap leaching.

Example 9

Figure 22:
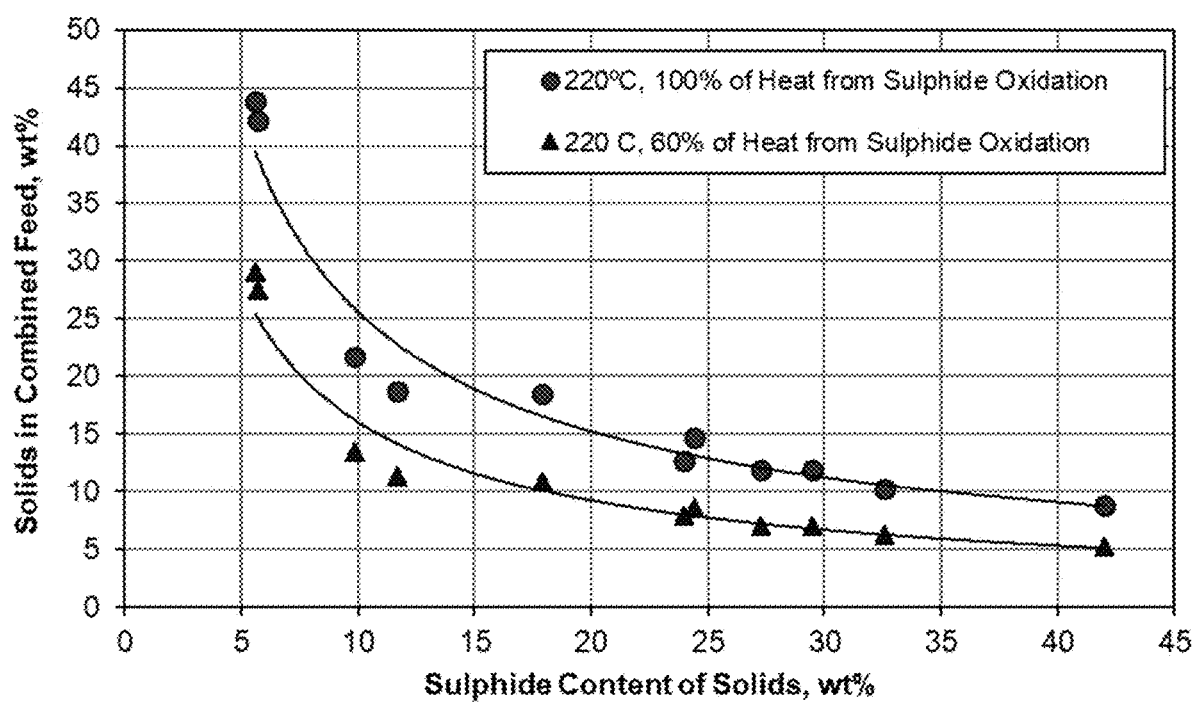

Conditions for operating the pressure oxidative leaching step at low solids in order to maintain the free acid level at or below 30 g/L vary with the sulphide sulphur content of the feeds (liquid and solids to the autoclave), and thus in aqueous feed slurry. Example 5 of Applicant's US Patent Publication 2018/0298466 provides a comparative model for determining target conditions for controlling the solids content for the pressure oxidative leaching step for different sulphide content in the aqueous feed slurry. FIG. 25 of US Patent Publication 2018/0298466, included herein as FIG. 22, shows two curves, plotting solids content in the aqueous feed slurry to the autoclave against sulphide content of the solids in the feed. The top curve shows autothermal operation for a range of historical data from pressure oxidative leaching testing, where 100% of the heat to maintain the operating temperature of 220° C. is provided by the oxidation of the sulphide content in the aqueous feed slurry with 20° C. quench water. This top curve is typical of heat balance data from prior art pressure oxidative leaching of sulphidic feeds, operated autothermally. The bottom curve shows the condition w, where only 60% of the heat to maintain the operating temperature of 220° C. is provided by the oxidation of the sulphide content in the aqueous feed slurry, and the remaining heat for the pressure oxidative leaching is added, for example with heated process water or steam to the autoclave, or by initially heating the feed to the autoclave. Low acidity, low solids pressure oxidative leaching step at 220 C is operated at solids concentrations below this bottom curve.

Figure 21:
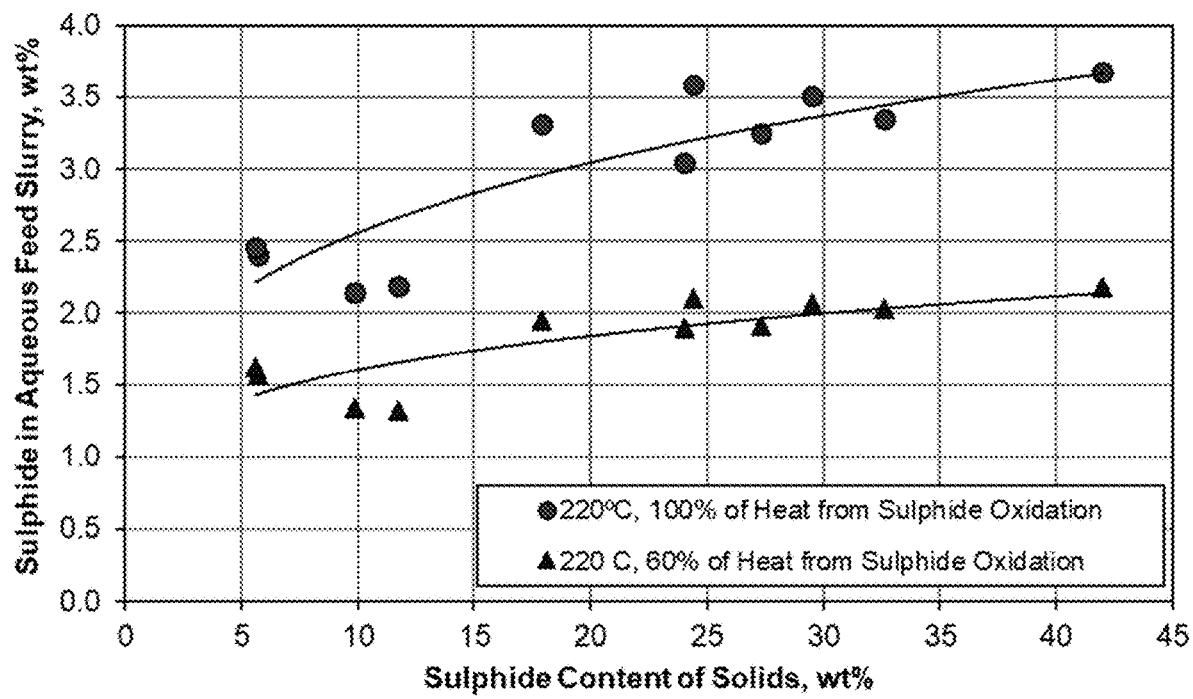

Based on the data provided in Example 5 and FIG. 25 of US Patent Publication 2018/0298466, FIG. 21 of this application provides a relationship between sulphide in the aqueous feed slurry (wt %) and the sulphide content of the solids (wt %) in the feed, with the top curve showing autothermal operation wherein the solids provide 100% of the heat to maintain a temperature of 220° C., and the bottom curve showing operation wherein the solids provide only 60% of the heat to maintain the temperature of 220° C. Based on US 2018/0298466, and supplemented with FIGS. 21 and 22 herein, ranges of low solids conditions can be determined for different feeds at 220 C, such that controlling solids in the aqueous feed slurry in the autoclave maintain a free acid level below 30 g/L in the liquid phase, and such that heat generated by oxidizing the aqueous feed slurry provides less than 60% of the heat to maintain the temperature in the pressure vessel at 220 C. While the curves were generated for a target temperature of 220 C, heat balance modelling can be used to generate similar curves for other conditions, including other temperatures (>200 C) or operating with less than 60% of the heat for the pressure oxidation reaction, such as less than 50%.

The experimental conditions set out above are exemplary only and the process may be practised under other conditions without departing from the invention.

The word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All publications mentioned in this specification are indicative of the level of skill of those skilled in the art to which this invention pertains. All publications are herein incorporated by reference to the same extent as if each individual publication was specifically and individually indicated to be incorporated by reference.

The terms and expressions used herein are used as terms of description and not limitation. There is no intention, in using such terms and expression of excluding equivalents of the features shown and described, it being recognized that the scope of the invention is defined and limited only by the claims.

We claim:

1. A process for recovering copper from a sulphidic feed containing iron, arsenic, and copper, comprising:
   a) pressure oxidizing an aqueous feed slurry of the sulphidic feed in a pressure vessel to form a liquid phase containing free sulphuric acid and aqueous copper sulphate, and to precipitate arsenic as solid iron arsenic compounds, while maintaining a temperature in the pressure vessel above 200° C.;
   b) withdrawing from the pressure vessel treated slurry comprising the liquid phase containing sulphuric acid and copper sulphate, and solids containing the iron arsenic compounds;
   c) separating the liquid phase from the solids in a liquid solid separating step;
   d) recovering copper from the separated liquid phase and generating a solution enriched in acid and depleted in copper;
   e) neutralizing at least a portion of the solution from step d) in a copper heap leach to produce a pregnant leach solution (PLS) containing copper and reduced in acid;
   f) neutralizing at least a portion of the PLS from the copper heap leach to produce a solution further reduced in acid, and solids containing copper precipitates, and separating the solution from the solids;
   g) recycling the solution further reduced in acid from step f) as a process solution for step a);
   h) recycling the separated solids from step f) by combining with either the treated slurry from step b) or the separated liquid phase from step c) to re-dissolve copper and other metal values; and
   i) separating the solids from step h) either combined with the treated slurry in the separating step c) or combined with the separated liquid phase from step c) in a further liquid solid separating step, and feeding the separated liquid phase from the separating step c) or from the further liquid solid separating step to the copper recovery of step d).

2. The process of claim 1, further comprising:
controlling solids content in the aqueous feed slurry in the pressure vessel such that a free acid level below 30 g/L is maintained in the liquid phase, and such that heat generated by oxidizing the aqueous feed slurry provides less than 60% of the heat to maintain the temperature in the pressure vessel above 200° C.; and
adding heat to maintain the temperature in the pressure vessel above 200° C.

3. The process of claim 2, wherein:
the solids content in the aqueous feed slurry is controlled by adding one or more of the process solution, steam and a feed slurry to the pressure vessel as part of the aqueous feed slurry, and
heat to maintain the temperature in the pressure vessel above 200° C. is provided to the pressure vessel by adding one or more of heated feed slurry, heated process solution and steam as part of the aqueous feed slurry.

4. The process of claim 3, further comprising heating the solution further reduced in acid from step f) to provide a heated process solution as part of the aqueous feed slurry for step a).

5. The process of claim 3, further comprising recovering heat or steam from one or more of the treated slurry, a subsequent pressure let down step, and a subsequent flashing step, and using that recovered heat or steam to supply at least a portion of the heat to the pressure vessel in step a).

6. The process of claim 3, wherein, in the copper recovery of step d), copper is recovered by solvent extraction and electrowinning, and a raffinate from the solvent extraction is the solution enriched in acid and depleted in copper used in the copper heap leach of step e).

7. The process of claim 6, wherein a portion of the PLS from the heap leach of step e) is fed to the copper recovery of step d), and copper is recovered by solvent extraction and electrowinning, and a portion of the PLS from the copper heap leach is neutralized in step f) to produce the solution further reduced in acid and the solids containing copper precipitates.

8. The process of claim 3, wherein, in the copper recovery of step d), copper is recovered by precipitating copper as copper sulphide by adding sulphur and sulphur dioxide to produce the solution enriched in acid and depleted in copper used in the copper heap leach of step e).

9. The process of claim 8, wherein:
i. a portion of the PLS from the copper heap leach of step e) is directed to a separate copper recovery by solvent extraction and electrowinning;
ii. a portion of the PLS from the copper heap leach of step e) is neutralized in step f) to produce the solution further reduced in acid and the solids containing copper precipitates, and
iii. a raffinate from the solvent extraction of step i) is used in the copper heap leach of step e).

10. The process of claim 8, wherein:
i. a portion of the PLS from the copper heap leach of step e) is directed to the copper recovery by precipitating copper as copper sulphide by adding sulphur and sulphur dioxide to produce the solution enriched in acid and depleted in copper for use in the heap leach of step e); and
ii. a portion of the PLS from the heap leach of step e) is neutralized in step f) to produce the solution further reduced in acid and the solids containing copper precipitates.

11. The process of claim 8, wherein the copper recovery by precipitating copper as copper sulphide includes adding sulphur and sulphur dioxide operating under the following conditions:
a copper sulphide precipitation step with temperature in the range of 80 to 110° C., or 100 to 110° C.;
a copper sulphide precipitation step with sulphur dioxide partial pressure in the range of 50 to 300 kPa, or 150 to 300 kPa; and
adding sulphur in a S:Cu ratio of 1:1 to 2:1.

12. The process of claim 11, further comprising recycling copper sulphide to the copper sulphide precipitation step to increase sulphur utilization and to increase a grade of copper.

13. The process of claim 3, wherein:
the sulphidic feed contains one or both of silver and gold;
the solids in step (b) include at least a portion of the silver and/or gold; and
the process further comprises recovering silver and/or gold from the solids after separation in step c) by cyanide leaching.

14. The process of claim 13, wherein the sulphidic feed contains silver and the silver recovery by cyanide leaching is performed without a jarosite destruction step after step a).

15. The process of claim 3, wherein:
neutralizing in step (f) to precipitate solids containing copper precipitates is conducted at a pH to precipitate at least a portion of the copper, aluminum, and the iron, without precipitating magnesium; and
in step g), magnesium in solution is recycled to the pressure vessel in the process solution for step a).

16. The process of claim 15, wherein neutralizing in step (f) to precipitate solids containing copper precipitates is conducted at the pH in the range of about 5.5 to 6.

17. The process of claim 16, wherein a neutralizing agent used in step f) contains limestone and optionally lime.

18. The process of claim 15, wherein, to increase magnesium in solution in step a), the process includes one or both of:
i) adding magnesium sulphate to one or more of the aqueous feed slurry in step a); the treated slurry in step c); the feed solution to step e); the feed solution to step f); and the feed solution to step g); and
ii) adding a magnesium-containing neutralizing agent in step f).

19. The process of claim 15, wherein lime is added to a portion of the solution separated from step f) to increase the pH in order to precipitate at least a portion of one or both of zinc and magnesium, and a solution reduced in one or both of zinc and magnesium is recycled with the process solution for step a).

20. The process of claim 3, wherein step h) is operated at a pH less than 2.5, or at a pH less than 1.5, to re-dissolve copper and other metal values including at least a portion of any aluminum and iron.

21. The process of claim 3, wherein:
the sulphidic feed contains an arsenic content above 0.5 wt %,
the aqueous feed slurry of step a) has a Fe:As mole ratio between about 2:1 and 10:1, and
step a) is operated at a solids content to maintain the free acid level below 27 g/L, or between about 5 and 25 g/L.

22. The process of claim 3, wherein the sulphide level in the aqueous feed slurry is below 2.1 wt %.

23. The process of claim 3, wherein:
the pressure vessel is an autoclave or a multi-compartment autoclave;

the temperature of the autoclave is maintained between 200 and 230° C. or between 210 and 230° C.

the autoclave is operated at a partial pressure of oxygen in the range of 200-1000 kPa, or at about 500 kPa; and a retention time in the autoclave is between 20 and 60 minutes.

24. The process of claim 23, wherein:

the sulphidic feed to step a) includes one or more of a sulphidic ore, a sulphidic concentrate and a sulphide-containing solid; and the aqueous feed slurry of step a) optionally includes an arsenical material generated from pyrometallurgical treatment of an arsenic-containing sulphidic material, one or both of roaster dust and a roaster calcine from a pyrometallurgical treatment of a copper ore or concentrate; and the process solution added to step a) optionally contains arsenic.

25. The process of claim 1, wherein, in the copper recovery of step d), copper is recovered by solvent extraction and electrowinning, and a raffinate from the solvent extraction is the solution enriched in acid and depleted in copper used in the heap leach of step e).

26. The process of claim 25, wherein a portion of the PLS from the heap leach of step e) is fed to the copper recovery of step d), and copper is recovered by solvent extraction and electrowinning, and a portion of the PLS from the copper heap leach is neutralized in step f) to produce the solution further reduced in acid and the solids containing copper precipitates.

27. The process of claim 1, wherein, in the copper recovery of step d), copper is recovered by precipitating copper as copper sulphide by adding sulphur and sulphur dioxide to produce the solution enriched in acid and depleted in copper used in the copper heap leach of step e).

28. The process of claim 27, wherein:

i. a portion of the PLS from the copper heap leach of step e) is directed to a separate copper recovery by solvent extraction and electrowinning;

ii. a portion of the PLS from the copper heap leach of step e) is neutralized in step f) to produce the solution further reduced in acid and the solids containing copper precipitates, and iii. a raffinate from the solvent extraction of step i) is used in the copper heap leach of step e).

29. The process of claim 27, wherein:

i. a portion of the PLS from the copper heap leach of step e) is directed to the copper recovery by precipitating copper as copper sulphide by adding sulphur and sulphur dioxide to produce the solution enriched in acid and depleted in copper for use in the heap leach of step e); and ii. a portion of the PLS from the heap leach of step e) is neutralized in step f) to produce the solution further reduced in acid and the solids containing copper precipitates.

30. The process of claim 27, wherein the copper recovery by precipitating copper as copper sulphide includes adding sulphur and sulphur dioxide operating under the following conditions:

a copper sulphide precipitation step with temperature in the range of 80 to 110° C., or 100 to 110° C.;

a copper sulphide precipitation step with sulphur dioxide partial pressure in the range of 50 to 300 kPa, or 150 to 300 kPa; and adding sulphur in a S:Cu ratio of 1:1 to 2:1.

31. The process of claim 30, further comprising recycling copper sulphide to the copper sulphide precipitation step to increase sulphur utilization and to increase a grade of copper.

32. The process of claim 1, wherein step h) is operated at a pH less than 2.5, or at a pH less than 1.5, to re-dissolve copper and other metal values including at least a portion of any aluminum and iron.

33. The process of claim 1, wherein:

the pressure vessel is an autoclave or a multi-compartment autoclave;

the temperature of the autoclave is maintained between 200 and 230° C., or between 210 and 230° C.;

the autoclave is operated at a partial pressure of oxygen in the range of 200-1000 kPa, or at about 500 kPa; and a retention time in the autoclave is between 30 and 90 minutes.

34. The process of claim 33, wherein:

the sulphidic feed to step a) includes one or more of a sulphidic ore, a sulphidic concentrate and a sulphide-containing solid; and the aqueous feed slurry of step a) optionally includes an arsenical material generated from pyrometallurgical treatment of an arsenic-containing sulphidic material, one or both of roaster dust and a roaster calcine from a pyrometallurgical treatment of a copper ore or concentrate; and the process solution added to step a) optionally contains arsenic.

* * * * *